(12) United States Patent
Thobe et al.

(10) Patent No.: US 12,297,965 B2
(45) Date of Patent: May 13, 2025

(54) SYSTEMS AND METHODS FOR MIXING HYDROGEN WITH NATURAL GAS

(71) Applicant: MARATHON PETROLEUM COMPANY LP, Findlay, OH (US)

(72) Inventors: Zachary D. Thobe, Findlay, OH (US); Stephen D. Ernst, Findlay, OH (US); Jason S. Dalton, Findlay, OH (US)

(73) Assignee: Marathon Petroleum Company LP, Findlay, OH (US)

( * ) Notice: Subject to any disclaimer, the term of this patent is extended or adjusted under 35 U.S.C. 154(b) by 0 days.

(21) Appl. No.: 18/788,992

(22) Filed: Jul. 30, 2024

(65) Prior Publication Data

US 2025/0052379 A1 Feb. 13, 2025

Related U.S. Application Data

(60) Provisional application No. 63/518,417, filed on Aug. 9, 2023.

(51) Int. Cl.
*F17D 3/12* (2006.01)
*B01F 23/10* (2022.01)
(Continued)

(52) U.S. Cl.
CPC ............... *F17D 3/12* (2013.01); *B01F 23/10* (2022.01); *B01F 35/2132* (2022.01);
(Continued)

(58) Field of Classification Search
CPC .... F17D 3/12; F17D 1/02; B01F 23/10; B01F 35/833; B01F 35/2132; B01F 2101/503
See application file for complete search history.

(56) References Cited

U.S. PATENT DOCUMENTS 2,626,627 A 1/1953 Jung et al.
2,864,252 A 12/1958 Schaschl
(Continued)

FOREIGN PATENT DOCUMENTS

AU 2010241217 11/2010
AU 2013202839 5/2014
(Continued)

OTHER PUBLICATIONS

Machine Translation of CN-115325460-A (Nov. 8, 2024) (Year: 2024).*
(Continued)

*Primary Examiner* — Matthew J Merkling
(74) *Attorney, Agent, or Firm* — RAY QUINNEY & NEBEKER P.C.; Paul N. Taylor

(57) ABSTRACT

Systems and methods for injecting hydrogen into a natural gas pipeline to lower the carbon intensity of the resulting fuel blend while achieving the required energy output thereof for the end user. In one embodiment a blend ratio for the blended fuel comprising hydrogen and natural gas is determined based at least in part on a minimum energy output for fuel combusted at an end-use location connected to the natural gas pipeline so that the blended fuel (i) has a lower carbon intensity than a natural gas stream flowing in the natural gas pipeline, and (ii) provides at least the minimum energy output when combusted at the end-use location. Further, one or more embodiments include adjusting a control valve of a hydrogen injection assembly connected to the natural gas pipeline upstream of the end-use location based at least in part on the blend ratio to thereby mix hydrogen into the natural gas pipeline and produce the blended fuel.

25 Claims, 9 Drawing Sheets

(51) Int. Cl.
  *B01F 35/21* (2022.01)
  *B01F 35/83* (2022.01)
  *B01F 101/00* (2022.01)
  *F17D 1/02* (2006.01)

(52) U.S. Cl.
  CPC .............. *B01F 35/833* (2022.01); *F17D 1/02* (2013.01); *B01F 2101/503* (2022.01); *Y02E 20/32* (2013.01)

(56) References Cited

U.S. PATENT DOCUMENTS

| | | |
|---|---|---|
| 3,087,311 A | 4/1963 | Rousseau |
| 3,303,525 A | 2/1967 | Peoples |
| 3,398,071 A | 8/1968 | Bagno |
| 3,504,686 A | 4/1970 | Cooper et al. |
| 3,593,555 A | 7/1971 | Grosko |
| 3,608,869 A | 9/1971 | Woodle |
| 3,672,180 A | 6/1972 | Davis |
| 3,725,669 A | 4/1973 | Tatum |
| 3,807,433 A | 4/1974 | Byrd |
| 3,809,113 A | 5/1974 | Grove |
| 3,814,148 A | 6/1974 | Wostl |
| 3,925,592 A | 12/1975 | Webb |
| 3,961,493 A | 6/1976 | Nolan, Jr. |
| 4,010,779 A | 3/1977 | Pollock et al. |
| 4,073,303 A | 2/1978 | Foley, Jr. |
| 4,109,677 A | 8/1978 | Burnside |
| 4,202,351 A | 5/1980 | Biche |
| 4,229,064 A | 10/1980 | Vetter et al. |
| 4,242,533 A | 12/1980 | Cott |
| 4,289,163 A | 9/1981 | Pierson |
| 4,294,378 A | 10/1981 | Rabinovich |
| 4,315,602 A | 2/1982 | Kubacak |
| 4,320,775 A | 3/1982 | Stirling et al. |
| 4,357,576 A | 11/1982 | Hickam et al. |
| 4,420,008 A | 12/1983 | Shu |
| 4,457,037 A | 7/1984 | Rylander |
| 4,481,474 A | 11/1984 | Gerrit |
| 4,488,570 A | 12/1984 | Jiskoot |
| 4,630,685 A | 12/1986 | Huck et al. |
| 4,690,587 A | 9/1987 | Petter |
| 4,744,305 A | 5/1988 | Lim et al. |
| 4,784,324 A | 11/1988 | DeWitt |
| 4,788,093 A | 11/1988 | Murata et al. |
| 4,794,331 A | 12/1988 | Schweitzer, Jr. |
| 4,848,082 A | 7/1989 | Takahashi |
| 4,897,226 A | 1/1990 | Hoyle et al. |
| 4,904,932 A | 2/1990 | Schweitzer, Jr. |
| 4,964,732 A | 10/1990 | Cadeo et al. |
| 5,050,064 A | 9/1991 | Mayhew |
| 5,072,380 A | 12/1991 | Randelman et al. |
| 5,095,977 A | 3/1992 | Ford |
| 5,129,432 A | 7/1992 | Dugger |
| 5,191,537 A | 3/1993 | Edge |
| 5,305,631 A | 4/1994 | Whited |
| 5,367,882 A | 11/1994 | Lievens et al. |
| 5,383,243 A | 1/1995 | Thacker |
| 5,423,607 A | 6/1995 | Jones |
| 5,469,830 A | 11/1995 | Gonzalez |
| 5,516,967 A * | 5/1996 | Pandey ..................... C01B 3/40 48/199 FM |
| 5,533,912 A | 7/1996 | Fillinger |
| 5,562,133 A | 10/1996 | Mitchell |
| 5,595,709 A | 1/1997 | Klemp |
| 5,603,360 A | 2/1997 | Teel |
| 5,627,749 A | 5/1997 | Waterman et al. |
| 5,628,351 A | 5/1997 | Ramsey, Jr. et al. |
| 5,660,602 A * | 8/1997 | Collier, Jr. ............. F02B 43/10 123/3 |
| 5,661,623 A | 8/1997 | McDonald |
| 5,783,916 A | 7/1998 | Blackburn |
| 5,814,982 A | 9/1998 | Thompson et al. |
| 5,832,967 A | 11/1998 | Andersson |
| 5,873,916 A | 2/1999 | Cemenska et al. |
| 5,887,974 A | 3/1999 | Pozniak |
| 5,895,347 A | 4/1999 | Doyle |
| 5,906,648 A | 5/1999 | Zoratti et al. |
| 5,906,877 A | 5/1999 | Popper et al. |
| 5,939,166 A | 8/1999 | Cheng et al. |
| 5,962,774 A | 10/1999 | Mowry |
| 5,973,593 A | 10/1999 | Botella |
| 5,993,054 A | 11/1999 | Tan et al. |
| 6,022,421 A | 2/2000 | Bath |
| 6,050,844 A | 4/2000 | Johnson |
| 6,065,903 A | 5/2000 | Doyle |
| 6,077,340 A | 6/2000 | Doyle |
| 6,077,418 A | 6/2000 | Iseri et al. |
| 6,098,601 A | 8/2000 | Reddy |
| 6,111,021 A | 8/2000 | Nakahama et al. |
| 6,149,351 A | 11/2000 | Doyle |
| 6,186,193 B1 | 2/2001 | Phallen et al. |
| 6,220,747 B1 | 4/2001 | Gosselin |
| 6,243,483 B1 | 6/2001 | Petrou et al. |
| 6,328,877 B1 | 12/2001 | Bushman |
| 6,333,374 B1 | 12/2001 | Chen |
| 6,346,813 B1 | 2/2002 | Kleinberg |
| 6,383,237 B1 | 5/2002 | Langer et al. |
| 6,427,384 B1 | 8/2002 | Davis, Jr. |
| 6,478,353 B1 | 11/2002 | Barrozo |
| 6,679,302 B1 | 1/2004 | Mattingly et al. |
| 6,719,921 B2 | 4/2004 | Steinberger et al. |
| 6,799,883 B1 | 10/2004 | Urquhart et al. |
| 6,834,531 B2 | 12/2004 | Rust |
| 6,840,292 B2 | 1/2005 | Hart et al. |
| 6,851,916 B2 | 2/2005 | Schmidt |
| 6,980,647 B1 | 12/2005 | Daugherty et al. |
| 6,987,877 B2 | 1/2006 | Paz-Pujalt et al. |
| 7,032,629 B1 | 4/2006 | Mattingly et al. |
| 7,091,421 B2 | 8/2006 | Kukita et al. |
| 7,121,040 B2 | 10/2006 | Wiese |
| 7,168,464 B2 * | 1/2007 | Diggins ..................... F17C 7/02 141/105 |
| 7,186,321 B2 | 3/2007 | Benham |
| 7,258,710 B2 | 8/2007 | Caro et al. |
| 7,275,366 B2 | 10/2007 | Powell et al. |
| 7,294,913 B2 | 11/2007 | Fischer et al. |
| 7,385,681 B2 | 6/2008 | Ninomiya et al. |
| 7,444,996 B2 | 11/2008 | Potier |
| 7,459,067 B2 | 12/2008 | Dunn et al. |
| 7,564,540 B2 | 7/2009 | Paulson |
| 7,631,671 B2 | 12/2009 | Mattingly et al. |
| 7,729,561 B1 | 6/2010 | Boland et al. |
| 7,749,308 B2 | 7/2010 | McCully |
| 7,810,988 B2 | 10/2010 | Kamimura et al. |
| 7,815,744 B2 | 10/2010 | Abney et al. |
| 7,832,338 B2 | 11/2010 | Caro et al. |
| 7,879,204 B2 | 2/2011 | Funahashi |
| 8,075,651 B2 | 12/2011 | Caro et al. |
| 8,282,265 B2 | 10/2012 | Breithhaupt |
| 8,299,811 B2 | 10/2012 | Wing |
| 8,312,584 B2 | 11/2012 | Hodde |
| 8,327,631 B2 | 12/2012 | Caro et al. |
| 8,368,405 B2 | 2/2013 | Siebens |
| 8,376,432 B1 | 2/2013 | Halger et al. |
| 8,402,746 B2 | 3/2013 | Powell et al. |
| 8,413,484 B2 | 4/2013 | Lubkowitz |
| 8,414,781 B2 | 4/2013 | Berard |
| 8,577,518 B2 | 11/2013 | Linden et al. |
| 8,597,380 B2 | 12/2013 | Buchanan |
| 8,616,760 B2 | 12/2013 | Williams et al. |
| 8,632,359 B2 | 1/2014 | Grimm |
| 8,647,162 B2 | 2/2014 | Henriksson et al. |
| 8,748,677 B2 | 6/2014 | Buchanan |
| 8,808,415 B2 | 8/2014 | Caro et al. |
| 8,912,924 B2 | 12/2014 | Scofield et al. |
| 8,979,982 B2 | 3/2015 | Jordan et al. |
| 9,038,855 B2 | 5/2015 | Lurcott et al. |
| 9,162,944 B2 | 10/2015 | Bennett et al. |
| 9,175,235 B2 | 11/2015 | Kastner |
| 9,222,480 B2 | 12/2015 | Younes et al. |
| 9,310,016 B2 | 4/2016 | Hodde |
| 9,329,066 B2 | 5/2016 | Skarping |
| 9,363,462 B2 | 6/2016 | Yoel |

(56) References Cited

U.S. PATENT DOCUMENTS

| | | |
|---|---|---|
| 9,388,350 B2 | 7/2016 | Buchanan |
| 9,497,956 B2 | 11/2016 | Dubose |
| 9,518,693 B2 | 12/2016 | Hodde |
| 9,530,121 B2 | 12/2016 | Brauer et al. |
| 9,550,247 B2 | 1/2017 | Smith |
| 9,643,135 B1 | 5/2017 | Mazzei et al. |
| 9,945,333 B2 | 4/2018 | Kopinsky |
| 10,001,240 B1 | 6/2018 | Dray et al. |
| 10,012,340 B1 | 7/2018 | Dray et al. |
| 10,024,768 B1 | 7/2018 | Johnsen |
| 10,094,508 B1 | 10/2018 | Dray et al. |
| 10,134,042 B1 | 11/2018 | Prasad et al. |
| 10,168,255 B1 | 1/2019 | Johnsen |
| 10,196,243 B1 | 2/2019 | Wells |
| 10,197,206 B1 | 2/2019 | Dray et al. |
| 10,223,596 B1 | 3/2019 | Edwards et al. |
| 10,247,643 B1 | 4/2019 | Johnsen |
| 10,261,279 B1 | 4/2019 | Potter |
| 10,287,940 B2 | 5/2019 | Tonsich |
| 10,345,221 B1 | 7/2019 | Silverman |
| 10,364,718 B2 | 7/2019 | Eddaoudi et al. |
| 10,386,260 B2 | 8/2019 | Dudek |
| 10,405,475 B2 | 9/2019 | Goda |
| 10,408,377 B1 | 9/2019 | Dray et al. |
| 10,486,946 B1 | 11/2019 | Wells |
| 10,501,385 B1 | 12/2019 | Buckner et al. |
| 10,563,555 B2 | 2/2020 | Hamad |
| 10,570,581 B2 | 2/2020 | Faivre |
| 10,605,144 B2 | 3/2020 | Kobayashi |
| 10,633,830 B2 | 4/2020 | Shibamori |
| 10,655,774 B1 | 5/2020 | Dray et al. |
| 10,657,443 B2 | 5/2020 | Araujo et al. |
| 10,688,686 B2 | 6/2020 | Fadhel et al. |
| 10,756,459 B2 | 8/2020 | Jongsma |
| 10,833,434 B1 | 11/2020 | Tassell, Jr. |
| 10,943,357 B2 | 3/2021 | Badawy et al. |
| 10,948,471 B1 | 3/2021 | MacMullin et al. |
| 10,953,960 B1 | 3/2021 | Sharp |
| 10,962,437 B1 | 3/2021 | Nottrott et al. |
| 10,970,927 B2 | 4/2021 | Sharp |
| 10,990,114 B1 | 4/2021 | Miller |
| 10,997,707 B1 | 5/2021 | Katz et al. |
| 11,010,608 B2 | 5/2021 | Adam et al. |
| 11,027,304 B2 | 6/2021 | Donaldson |
| 11,112,308 B2 | 9/2021 | Kreitinger et al. |
| 11,125,391 B2 | 9/2021 | Al Khowaiter et al. |
| 11,132,008 B2 | 9/2021 | Miller |
| 11,164,406 B2 | 11/2021 | Meroux et al. |
| 11,221,107 B2 | 1/2022 | Du et al. |
| 11,247,184 B2 | 2/2022 | Miller |
| 11,320,519 B2 | 5/2022 | Koivuranta |
| 11,325,687 B1 | 5/2022 | Sharp |
| 11,332,070 B2 | 5/2022 | Holden et al. |
| 11,345,455 B2 | 5/2022 | Sharp |
| 11,416,012 B2 | 8/2022 | Miller |
| 11,428,600 B2 | 8/2022 | Dankers et al. |
| 11,428,622 B2 | 8/2022 | Borin et al. |
| 11,441,088 B2 | 9/2022 | Robbins |
| 11,447,877 B1 | 9/2022 | Ell |
| 11,559,774 B2 | 1/2023 | Miller |
| 11,565,221 B2 | 1/2023 | Miller |
| 11,578,638 B2 | 2/2023 | Thobe |
| 11,578,836 B2 | 2/2023 | Thobe |
| 11,596,910 B2 | 3/2023 | Miller |
| 11,607,654 B2 | 3/2023 | Miller |
| 11,655,748 B1 | 5/2023 | Thobe |
| 11,655,940 B2 | 5/2023 | Thobe |
| 11,662,750 B2 | 5/2023 | Miller |
| 11,686,070 B1 | 6/2023 | Jordan et al. |
| 11,687,858 B2 | 6/2023 | Rentz |
| 11,715,950 B2 | 8/2023 | Miller et al. |
| 11,720,526 B2 | 8/2023 | Miller et al. |
| 11,739,679 B2 | 8/2023 | Thobe |
| 11,752,472 B2 | 9/2023 | Miller |
| 11,754,225 B2 | 9/2023 | Thobe |
| 11,761,366 B2 | 9/2023 | Thobe |
| 11,774,042 B2 | 10/2023 | Thobe |
| 11,789,453 B2 | 10/2023 | Chowdhary |
| 11,794,153 B2 | 10/2023 | Miller |
| 11,807,945 B2 | 11/2023 | Ell |
| 11,808,013 B1 | 11/2023 | Jordan et al. |
| 11,815,227 B2 | 11/2023 | Thobe |
| 11,842,538 B2 | 12/2023 | Saxena |
| 11,920,504 B2 | 3/2024 | Thobe |
| 11,965,317 B2 | 4/2024 | Jordan |
| 11,988,336 B2 | 5/2024 | Thobe |
| 12,000,538 B2 | 6/2024 | Thobe |
| 12,006,014 B1 | 6/2024 | Ernst |
| 12,011,697 B2 | 6/2024 | Miller |
| 12,012,082 B1 | 6/2024 | Pittman, Jr. |
| 12,012,883 B2 | 6/2024 | Thobe |
| 12,043,361 B1 | 7/2024 | Ernst |
| 12,043,905 B2 | 7/2024 | Ell |
| 12,043,906 B2 | 7/2024 | Ell |
| 12,066,843 B2 | 8/2024 | Miller |
| 12,087,002 B1 | 9/2024 | Miller et al. |
| 12,109,543 B2 | 10/2024 | Miller |
| 12,128,369 B2 | 10/2024 | Miller |
| 12,129,559 B2 | 10/2024 | Ell |
| 12,163,625 B2 | 12/2024 | Thobe |
| 12,180,597 B2 | 12/2024 | Ell |
| 2001/0013517 A1 | 8/2001 | Hart |
| 2002/0014068 A1 | 2/2002 | Mittricker et al. |
| 2002/0178806 A1 | 12/2002 | Valentine |
| 2002/0185180 A1 | 12/2002 | Smith |
| 2003/0041518 A1 | 3/2003 | Wallace et al. |
| 2003/0121481 A1 | 7/2003 | Dodd et al. |
| 2003/0158630 A1 | 8/2003 | Pham et al. |
| 2003/0167660 A1 | 9/2003 | Kondou |
| 2003/0178994 A1 | 9/2003 | Hurlimann et al. |
| 2003/0188536 A1 | 10/2003 | Mittricker |
| 2003/0197622 A1 | 10/2003 | Reynard et al. |
| 2003/0227821 A1 | 12/2003 | Bae et al. |
| 2004/0057334 A1 | 3/2004 | Wilmer et al. |
| 2004/0058597 A1 | 3/2004 | Matsuda |
| 2004/0067126 A1 | 4/2004 | Schmidt |
| 2004/0125688 A1 | 7/2004 | Kelley et al. |
| 2004/0249105 A1 | 12/2004 | Nolte et al. |
| 2004/0251313 A1 | 12/2004 | Burgess |
| 2004/0265653 A1 | 12/2004 | Buechi et al. |
| 2005/0007450 A1 | 1/2005 | Hill et al. |
| 2005/0058016 A1 | 3/2005 | Smith et al. |
| 2005/0146437 A1 | 7/2005 | Ward |
| 2005/0150820 A1 | 7/2005 | Guo |
| 2005/0154132 A1 | 7/2005 | Hakuta et al. |
| 2005/0176482 A1 | 8/2005 | Raisinghani et al. |
| 2005/0284333 A1 | 12/2005 | Falkiewicz |
| 2006/0125826 A1 | 6/2006 | Lubkowitz |
| 2006/0263283 A1* | 11/2006 | Egan ............... B01F 23/19 423/210 |
| 2006/0278304 A1 | 12/2006 | Mattingly et al. |
| 2007/0175511 A1 | 8/2007 | Doerr |
| 2007/0181083 A1* | 8/2007 | Fulton ............... G06Q 30/0225 123/3 |
| 2008/0092625 A1 | 4/2008 | Hinnrichs |
| 2008/0113884 A1 | 5/2008 | Campbell et al. |
| 2008/0115834 A1 | 5/2008 | Geoffrion et al. |
| 2008/0149481 A1 | 6/2008 | Hurt |
| 2008/0283083 A1 | 11/2008 | Piao |
| 2009/0009308 A1 | 1/2009 | Date et al. |
| 2009/0107111 A1 | 4/2009 | Oliver |
| 2009/0154288 A1 | 6/2009 | Heathman |
| 2009/0175738 A1 | 7/2009 | Shaimi |
| 2009/0183498 A1 | 7/2009 | Uchida et al. |
| 2009/0188565 A1 | 7/2009 | Satake |
| 2009/0197489 A1 | 8/2009 | Caro |
| 2009/0278839 A1 | 11/2009 | Geis |
| 2010/0031825 A1 | 2/2010 | Kemp |
| 2010/0049410 A1 | 2/2010 | McKee |
| 2010/0058666 A1 | 3/2010 | Kim |
| 2010/0175316 A1 | 7/2010 | Kubacak |
| 2010/0198775 A1 | 8/2010 | Rousselle |
| 2011/0265449 A1 | 11/2011 | Powell |
| 2012/0027298 A1 | 2/2012 | Dow |

(56) References Cited

U.S. PATENT DOCUMENTS

| | | |
|---|---|---|
| 2012/0092835 A1 | 4/2012 | Miller |
| 2012/0143560 A1 | 6/2012 | Tabet et al. |
| 2012/0153042 A1 | 6/2012 | Oedekoven |
| 2012/0185220 A1 | 7/2012 | Shippen |
| 2012/0276379 A1 | 11/2012 | Daniels et al. |
| 2012/0304625 A1 | 12/2012 | Daikoku |
| 2013/0035824 A1 | 2/2013 | Nakamura |
| 2013/0048094 A1 | 2/2013 | Ballantyne |
| 2013/0062258 A1 | 3/2013 | Ophus |
| 2013/0125323 A1 | 5/2013 | Henderson |
| 2013/0176656 A1 | 7/2013 | Kaisser |
| 2013/0186671 A1 | 7/2013 | Theis |
| 2013/0201025 A1 | 8/2013 | Kamalakannan et al. |
| 2013/0245524 A1 | 9/2013 | Schofield |
| 2013/0293884 A1 | 11/2013 | Lee et al. |
| 2013/0299500 A1 | 11/2013 | McKinnon |
| 2013/0317959 A1* | 11/2013 | Joos .................. C25B 9/17 205/637 |
| 2014/0002639 A1 | 1/2014 | Cheben et al. |
| 2014/0008926 A1 | 1/2014 | Allen |
| 2014/0062490 A1 | 3/2014 | Neuman et al. |
| 2014/0090379 A1 | 4/2014 | Powell et al. |
| 2014/0121622 A1 | 5/2014 | Jackson et al. |
| 2014/0133824 A1 | 5/2014 | Yoel |
| 2014/0158616 A1 | 6/2014 | Govind et al. |
| 2014/0158632 A1 | 6/2014 | Govind et al. |
| 2014/0171538 A1 | 6/2014 | Daniels et al. |
| 2014/0172513 A1 | 6/2014 | MacLean |
| 2014/0176344 A1 | 6/2014 | Littlestar |
| 2014/0190691 A1 | 7/2014 | Vinegar |
| 2014/0194657 A1 | 7/2014 | Wadhwa et al. |
| 2014/0299039 A1 | 10/2014 | Trollux |
| 2014/0345370 A1 | 11/2014 | Marotta |
| 2014/0356707 A1 | 12/2014 | Kwon et al. |
| 2015/0081165 A1 | 3/2015 | Yamashita et al. |
| 2015/0144468 A1 | 5/2015 | Skolozdra |
| 2015/0183102 A1 | 7/2015 | Breschi et al. |
| 2015/0198518 A1 | 7/2015 | Borin et al. |
| 2015/0244087 A1 | 8/2015 | Wing |
| 2015/0269288 A1 | 9/2015 | Moore |
| 2015/0323119 A1 | 11/2015 | Giunta |
| 2016/0071059 A1 | 3/2016 | Petering |
| 2016/0091467 A1 | 3/2016 | Morris |
| 2016/0139355 A1 | 5/2016 | Petersen |
| 2016/0169098 A1 | 6/2016 | Makita |
| 2016/0169436 A1 | 6/2016 | Sander et al. |
| 2016/0175634 A1 | 6/2016 | Radian |
| 2016/0238194 A1 | 8/2016 | Adler et al. |
| 2016/0252650 A1 | 9/2016 | Hirst, Sr. |
| 2016/0363249 A1 | 12/2016 | Disher |
| 2016/0369930 A1 | 12/2016 | Poe et al. |
| 2017/0051472 A1 | 2/2017 | Mochimaru |
| 2017/0088401 A1 | 3/2017 | Clements et al. |
| 2017/0122174 A1 | 5/2017 | Patel |
| 2017/0131728 A1 | 5/2017 | Lambert et al. |
| 2017/0140237 A1 | 5/2017 | Voeller et al. |
| 2017/0158303 A1 | 6/2017 | Michaelis et al. |
| 2017/0180012 A1 | 6/2017 | Tingler et al. |
| 2017/0248569 A1 | 8/2017 | Lambert et al. |
| 2017/0253737 A1 | 9/2017 | Auld et al. |
| 2017/0253738 A1 | 9/2017 | Auld et al. |
| 2017/0253806 A1 | 9/2017 | Auld et al. |
| 2017/0254481 A1 | 9/2017 | Cadogan et al. |
| 2017/0259229 A1 | 9/2017 | Chou et al. |
| 2017/0306428 A1 | 10/2017 | Helgason et al. |
| 2017/0326474 A1 | 11/2017 | Olovsson |
| 2017/0367346 A1 | 12/2017 | Rees et al. |
| 2018/0002617 A1 | 1/2018 | Umansky et al. |
| 2018/0003116 A1 | 1/2018 | Fersman et al. |
| 2018/0037452 A1 | 2/2018 | Gray et al. |
| 2018/0080356 A1 | 3/2018 | Fukui |
| 2018/0098137 A1 | 4/2018 | Saha |
| 2018/0119882 A1 | 5/2018 | Allidieres et al. |
| 2018/0143734 A1 | 5/2018 | Ochenas et al. |
| 2018/0186528 A1 | 7/2018 | Tonn |
| 2018/0218214 A1 | 8/2018 | Pestun |
| 2018/0223202 A1 | 8/2018 | Fransham et al. |
| 2018/0245313 A1 | 8/2018 | Shibamori et al. |
| 2018/0259064 A1 | 9/2018 | McLemore |
| 2018/0312391 A1 | 11/2018 | Borg |
| 2019/0016963 A1 | 1/2019 | Auld et al. |
| 2019/0121373 A1 | 4/2019 | Panigrahi |
| 2019/0367732 A1 | 5/2019 | Helgason et al. |
| 2019/0270500 A1 | 9/2019 | Hamaoka |
| 2019/0295189 A1 | 9/2019 | Strasser |
| 2019/0338203 A1 | 11/2019 | Umansky et al. |
| 2019/0359899 A1 | 11/2019 | Umansky et al. |
| 2019/0362147 A1 | 11/2019 | Adam |
| 2019/0136060 A1 | 12/2019 | Helgason et al. |
| 2019/0368054 A1 | 12/2019 | Gummow et al. |
| 2019/0368156 A1 | 12/2019 | Faivre |
| 2020/0033252 A1 | 1/2020 | Borin et al. |
| 2020/0118413 A1 | 4/2020 | Kanukurthy et al. |
| 2020/0232191 A1 | 7/2020 | Prior |
| 2020/0235559 A1 | 7/2020 | Neuenschwander |
| 2020/0240588 A1 | 7/2020 | Al Khowaiter |
| 2020/0245551 A1 | 8/2020 | Hoffman et al. |
| 2020/0245552 A1 | 8/2020 | Hoffman et al. |
| 2020/0245553 A1 | 8/2020 | Hoffman et al. |
| 2020/0292445 A1 | 9/2020 | Morimoto |
| 2020/0325742 A1 | 10/2020 | Astudillo et al. |
| 2021/0053011 A1 | 2/2021 | Sugiyama et al. |
| 2021/0062697 A1 | 3/2021 | Yokoyama et al. |
| 2021/0073692 A1 | 3/2021 | Saha et al. |
| 2021/0076006 A1 | 3/2021 | O'Neill et al. |
| 2021/0095380 A1 | 4/2021 | Borin et al. |
| 2021/0123211 A1 | 4/2021 | Miller et al. |
| 2021/0138399 A1 | 5/2021 | Yokoyama et al. |
| 2021/0192938 A1 | 6/2021 | Doerr et al. |
| 2021/0197151 A1 | 7/2021 | Miller |
| 2021/0207772 A1 | 7/2021 | Norton et al. |
| 2021/0215925 A1 | 7/2021 | Kim et al. |
| 2021/0216852 A1 | 7/2021 | Reece et al. |
| 2021/0232163 A1 | 7/2021 | Miller |
| 2021/0232741 A1 | 7/2021 | Ogiso et al. |
| 2021/0348281 A1 | 11/2021 | da Costa |
| 2021/0362637 A1 | 11/2021 | Hanis et al. |
| 2021/0381920 A1 | 12/2021 | Jacobsz et al. |
| 2022/0001969 A1 | 1/2022 | Pugnetti |
| 2022/0010707 A1 | 1/2022 | Sharma et al. |
| 2022/0048606 A1 | 2/2022 | Singh |
| 2022/0081261 A1 | 3/2022 | Karbassi |
| 2022/0087099 A1 | 3/2022 | Hoffman et al. |
| 2022/0154427 A1 | 5/2022 | Misaki |
| 2022/0178114 A1 | 6/2022 | Takahama |
| 2022/0183208 A1 | 6/2022 | Sibley |
| 2022/0186470 A1 | 6/2022 | Chiba et al. |
| 2022/0213603 A1 | 7/2022 | Al Eid et al. |
| 2022/0221368 A1 | 7/2022 | Bergeron |
| 2022/0228345 A1 | 7/2022 | Case et al. |
| 2022/0282651 A1 | 9/2022 | Reynolds et al. |
| 2022/0290411 A1 | 9/2022 | Anahara et al. |
| 2022/0343229 A1 | 10/2022 | Gruber et al. |
| 2022/0401899 A1 | 12/2022 | Miller |
| 2022/0404272 A1 | 12/2022 | Kendall et al. |
| 2022/0405870 A1 | 12/2022 | Conway |
| 2023/0012038 A1 | 1/2023 | Tyer |
| 2023/0012673 A1 | 1/2023 | Fukuyama et al. |
| 2023/0015077 A1 | 1/2023 | Kim |
| 2023/0061824 A1 | 3/2023 | Ell |
| 2023/0078852 A1 | 3/2023 | Campbell et al. |
| 2023/0129513 A1 | 4/2023 | Miller |
| 2023/0259080 A1 | 8/2023 | Whikehart et al. |
| 2023/0259088 A1 | 8/2023 | Borup et al. |
| 2023/0332532 A1 | 10/2023 | Thobe |
| 2023/0333577 A1 | 10/2023 | Miller |
| 2023/0333578 A1 | 10/2023 | Miller |
| 2023/0338897 A1 | 10/2023 | Bednar |
| 2023/0341092 A1 | 10/2023 | Thobe |
| 2023/0347303 A1 | 11/2023 | Miller |
| 2023/0358023 A1 | 11/2023 | Jordan et al. |
| 2023/0360151 A1 | 11/2023 | Swamy |
| 2023/0366510 A1 | 11/2023 | Thobe |
| 2023/0383416 A1 | 11/2023 | Ell |

(56) References Cited

U.S. PATENT DOCUMENTS

| | | |
|---|---|---|
| 2023/0383417 A1 | 11/2023 | Ell |
| 2023/0383418 A1 | 11/2023 | Ell |
| 2023/0392536 A1 | 12/2023 | Thobe |
| 2023/0399817 A1 | 12/2023 | Jordan |
| 2023/0399818 A1 | 12/2023 | Jordan |
| 2023/0407488 A1 | 12/2023 | Ell |
| 2023/0415106 A1 | 12/2023 | Miller |
| 2024/0003016 A1 | 1/2024 | Ell |
| 2024/0060189 A1 | 2/2024 | Ell |
| 2024/0071073 A1 | 2/2024 | Rajora |
| 2024/0141506 A1 | 5/2024 | Ell |
| 2024/0166492 A1 | 5/2024 | Thobe |
| 2024/0209988 A1 | 6/2024 | Thobe |
| 2024/0217498 A1 | 7/2024 | Pittman, Jr. |
| 2024/0255102 A1 | 8/2024 | Thobe |
| 2024/0269626 A1 | 8/2024 | Miller |
| 2024/0271556 A1 | 8/2024 | Thobe |
| 2024/0278762 A1 | 8/2024 | Pittman, Jr. |
| 2024/0278894 A1 | 8/2024 | Ernst |
| 2024/0286726 A1 | 8/2024 | Ernst |
| 2024/0301811 A1 | 9/2024 | Thobe |
| 2024/0327992 A1 | 10/2024 | Ell |
| 2024/0327993 A1 | 10/2024 | Ell |

FOREIGN PATENT DOCUMENTS

| | | |
|---|---|---|
| AU | 2009202785 B | 11/2014 |
| CA | 2447358 | 4/2005 |
| CA | 2702151 | 10/2007 |
| CA | 2637421 | 1/2010 |
| CA | 2642295 | 1/2010 |
| CA | 2736733 | 10/2011 |
| CA | 2958443 | 4/2017 |
| CA | 2995532 | 4/2017 |
| CA | 2916141 | 6/2017 |
| CN | 2092562 | 1/1992 |
| CN | 200958686 | 10/2007 |
| CN | 100348970 | 11/2007 |
| CN | 102997052 | 3/2013 |
| CN | 202898548 U | 4/2013 |
| CN | 103106764 | 5/2013 |
| CN | 103497804 | 1/2014 |
| CN | 102997061 | 5/2015 |
| CN | 204824775 | 12/2015 |
| CN | 205640252 | 10/2016 |
| CN | 104372350 B | 2/2017 |
| CN | 106764463 | 1/2019 |
| CN | 208306600 | 1/2019 |
| CN | 110513604 | 11/2019 |
| CN | 210176958 | 3/2020 |
| CN | 111537157 | 8/2020 |
| CN | 114001278 | 2/2022 |
| CN | 113719746 | 11/2022 |
| CN | 115325460 A * | 11/2022 |
| CN | 114877263 | 4/2023 |
| CN | 220458389 U | 2/2024 |
| EP | 2458573 | 5/2012 |
| EP | 2586304 A1 | 5/2013 |
| EP | 2602609 | 6/2013 |
| EP | 3076461 | 10/2016 |
| EP | 3101411 | 12/2016 |
| EP | 3112011 | 1/2017 |
| EP | 2994626 | 1/2018 |
| EP | 3285759 | 2/2018 |
| ES | 2398302 | 3/2013 |
| FR | 2388762 | 11/1978 |
| FR | 2689241 | 10/1993 |
| GB | 1179978 | 2/1970 |
| GB | 2097687 | 11/1982 |
| GB | 2545207 | 6/2017 |
| GB | 2559149 | 4/2022 |
| IN | 202141001384 | 1/2021 |
| IT | 201900008235 | 12/2020 |
| JP | 2004125039 | 4/2004 |
| JP | 2007204023 | 8/2007 |
| JP | 2008097832 | 4/2008 |
| JP | 2012002159 | 11/2014 |
| JP | 2016078893 | 5/2016 |
| KR | 20110010316 | 2/2011 |
| KR | 20130038986 | 4/2013 |
| KR | 20200007444 A * | 1/2020 |
| KR | 102129951 | 7/2020 |
| KR | 102169280 | 10/2020 |
| KR | 102281640 | 7/2021 |
| RU | 2760879 | 12/2021 |
| RU | 217534 U1 | 4/2023 |
| WO | 1996006685 | 5/1996 |
| WO | 1997006004 | 2/1997 |
| WO | 1997006298 | 2/1997 |
| WO | 1998003711 | 1/1998 |
| WO | 199917606 | 4/1999 |
| WO | 2000063108 | 10/2000 |
| WO | 2002030551 | 4/2002 |
| WO | 2002082181 | 10/2002 |
| WO | 2003003002 | 1/2003 |
| WO | 2003066423 | 8/2003 |
| WO | 2004003293 | 1/2004 |
| WO | 2004092307 | 10/2004 |
| WO | 2005018300 | 3/2005 |
| WO | 2007107652 | 9/2007 |
| WO | 2007112335 | 10/2007 |
| WO | 2007149851 | 12/2007 |
| WO | 2009013544 | 1/2009 |
| WO | 2009055024 | 4/2009 |
| WO | 2010002274 | 1/2010 |
| WO | 2010042704 | 4/2010 |
| WO | 2010103260 | 9/2010 |
| WO | 2011127535 | 10/2011 |
| WO | 2013112274 | 8/2013 |
| WO | 2014089443 | 6/2014 |
| WO | 2014173672 | 10/2014 |
| WO | 2015061868 | 5/2015 |
| WO | 2015153607 | 10/2015 |
| WO | 2016004107 | 1/2016 |
| WO | 2016026043 | 2/2016 |
| WO | 2016146404 | 9/2016 |
| WO | 2017074985 | 5/2017 |
| WO | 2017083778 | 5/2017 |
| WO | 2017087731 | 5/2017 |
| WO | 2017152269 | 9/2017 |
| WO | 2018005141 | 1/2018 |
| WO | 2018102378 | 6/2018 |
| WO | 2020044026 | 3/2020 |
| WO | 2020118020 | 6/2020 |
| WO | 2020132632 | 6/2020 |
| WO | 2020223803 | 11/2020 |
| WO | 2020237112 | 11/2020 |
| WO | 2021062563 | 4/2021 |
| WO | 2021100054 | 5/2021 |
| WO | 2022043197 | 3/2022 |
| WO | 2022126092 | 6/2022 |
| WO | 2022149501 | 7/2022 |
| WO | 2022269052 | 12/2022 |
| WO | 2023287276 | 1/2023 |
| WO | 2023021769 | 2/2023 |
| WO | 2023038579 | 3/2023 |
| WO | 2023060350 | 4/2023 |
| WO | 2023137304 | 7/2023 |
| WO | 2023164683 | 8/2023 |
| ZA | 9606765 | 2/1998 |
| ZA | 200610366 | 1/2008 |

OTHER PUBLICATIONS

Machine Translation of KR-20200007444-A (Nov. 8, 2024) (Year: 2024).*

Annex to Form PCT/ISA/206, Communication Relating to the Results of the Partial International Search for international application No. PCT/US2024/021101 mailed Aug. 13, 2024.

Sadovnychiy, Sergiy et al. "Geographical information system applications for pipeline right of way aerial surveillance", International Conference on Geographical Information Systems Theory, Applications and Management, vol. 2, Scitepress, 2017.

(56) References Cited

OTHER PUBLICATIONS

Paschal, Kayla, "Utility Right of Way Management: Potential for Expanded Integrated Vegetation Management in California", 2014.
Skelton et al., Onboard Refueling Vapor Recovery Systems Analysis of Widespread Use, Nescaum, Boston MA, Aug. 20, 2007.
Membrane Technology and Research, Inc., Gasoline Vapor Recovery, 2018.
Jordan Technologies, Aereon, Recovering More Vapor = Increased Profits, 2015.
EPFL, Capturing CO2 from trucks and reducing their emissions by 90%, Dec. 23, 2019.
Sharma, Shivom et al., Carbon Dioxide Capture from Internal Combustion Engine Exhaust Using Temperature Swing Adsorption, Front. Energy Res., Sec. Carbon Capture, Utilization and Storage, Dec. 16, 2019.
Information Disclosure Declaration by Kyle E. Miller, Dec. 18, 2020.
Cott Manufacturing Company, FinkLet®/FinkPlate® Cathodic Proection Test Stations, Wayback Machine, May 22, 2000.
International Search Report and Written Opinion for international application No. PCT/US2024/021099 mailed on Aug. 2, 2024.
Alexandrakis et al.,"Marine Transportation for Carbon Capture and Sequestration (CCS)", Department of Civil and Environmental Engineering, Thesis, Massachusetts Institute of Technology, Jun. 2010.
Datta et al., "Advancing carbon management through the global commoditization of CO2: the case for dual-use LNG-CO2 shipping", Carbon Management, 2020, vol. 11, No. 6, 611-630.
Ibitoye et al., "Poster Abstract: A Convolutional Neural Network Based Solution for Pipeline Leak Detection", School of Information Technology, Carleton University, Ottawa, Canada, Nov. 2019.
IntelliView, "Thermal Imaging Provides Early Leak Detection in Oil and Gas Pipelines", Petro Industry News, www.Petro-Online.com, Aug./Sep. 2018.
Southwest Research Institute, "Methane Leak Detection", 2021.
Masterduct, "Case Studies: High temp marine grade ship engine exhaust fume hose", retrieved at https://www.masterduct.com/CaseStudies/Hightempshipengineexhaustfumehose.aspx.
Acti, "Advanced Maritime Emissions Control System (AMECS)", retrieved at https://sustainableworldports.org/wp-content/uploads/presentation-on-AMECS.pdf.
Lloyd's Register, Using technology to trace the carbon intensity of sustainable marine fuels, Feb. 15, 2023.
Borin Manufacturing, Inc., DART for Test Station, Above Ground Remote Monitoring, Feb. 11, 2021.
Borin Manufacturing, Inc., Commanche Remote Monitoring and Control System, Mar. 24, 2017.
Borin Manufacturing, Inc., Dart for Rectifiers, Remote Monitoring and Control System. Nov. 1, 2017.
Borin Manufacturing, Inc., Stelth 2 Solid-State Reference Electrode for Buried and Concrete Service, Aug. 7, 2015.
Borin Manufacturing, Inc., Stelth 3, Nov. 10, 2016.
Borin Manufacturing, Inc., Stelth Reference Electrodes, Feb. 4, 2016.
Borin Manufacturing, Inc., Stelth Solid-State Reference Electrodes, Nov. 8, 2016.
Borin Manufacturing, Inc., Stelth Reference Electrodes, Oct. 10, 2017.
Borin Manufacturing, Inc., 'Miracle half-cell', Palladium: Borin's new reference electrode chemistry, Aug. 13, 2014.
Borin Manufacturing, Inc., Street Dart, for Test Station, Ground Level Remote Monitoring, Mar. 2017.
Neutrik XXR-2 XX Series, https://www.parts-express.com/Neutrik-XXR-2-XX-Series-Color-Coding_Ring-Red, 2022.
Hou, Qingmin, An FBG Strain Sensor-Based NPW Method for Natural Gas Pipeline Leakage Detection, Hindawi, Mathematical Problems in Engineering, vol. 2021, Article ID 5548503, pp. 1-8.
International Search Report and Written Opinion for international application No. PCT/US2024/021101 mailed on Oct. 9, 2024.

\* cited by examiner

SYSTEMS AND METHODS FOR MIXING HYDROGEN WITH NATURAL GAS

CROSS REFERENCE TO RELATED APPLICATIONS

This application claims priority to and the benefit of U.S. Provisional Application No. 63/518,417, filed Aug. 9, 2023, titled "SYSTEMS AND METHODS FOR MIXING HYDROGEN WITH NATURAL GAS," the disclosure of which is incorporated herein by reference in its entirety.

BACKGROUND

Natural gas is commonly used as a fuel source in a wide range of applications and industries. For instance, natural gas is utilized as a combustible fuel source for electricity production, heating, and cooking, among others. This heavy reliance on natural gas has facilitated the construction of an expansive pipeline network that allows efficient movement of natural gas from sources (such as a subterranean wellbores, processing facilities, and refineries, among others) to various end-use locations, where the natural gas is ultimately utilized as a fuel.

Concerns over the amount of carbon emitted (in the form of greenhouse gases) into the atmosphere via the burning of hydrocarbon-based fuels such as natural gas have increased in recent years. As a result, there is a desire to decrease carbon emissions, while minimizing negative economic and energy impacts. To quantify the direct and indirect release of greenhouse gases attributable to consumer and/or industrial activity, carbon intensity (CI) was developed as a measure of the greenhouse gases emitted per unit of activity/production. With respect to combustible fuel, the CI may be defined as the lifecycle greenhouse gases emitted per unit of energy. The CI for a combustible fuel, such as natural gas, is often reported in units of grams of carbon dioxide equivalent per mega joule of energy.

BRIEF SUMMARY

At least some embodiments disclosed herein are directed to systems and methods for mixing hydrogen into a stream of natural gas, so as to lower a density of carbon and therefore reduce carbon emissions associated therewith. In some embodiments, the reduction in carbon emissions for the natural gas may be characterized by a reduction in the CI for the natural gas. In some embodiments, the systems and methods for mixing of hydrogen into a stream of natural gas may include on-demand injecting and mixing of hydrogen into the natural gas stream to achieve a desired, targeted, or selected blend ratio that is based on a variety of factors, including, without limitation, the energy output requirements for fuel combusted at the end-use location, the limitations of the end-use location's infrastructure, a targeted minimum energy output of a fuel specification for an end-use location, one or more characteristics of the natural gas stream, and/or one or more characteristics of the injected hydrogen stream. Thus, through use of the embodiments disclosed herein, hydrogen may be mixed into a stream of natural gas to effectively lower its CI (relative to a CI of the natural gas stream) while avoiding undesirable impact to the performance of the natural gas as a fuel source and/or downstream infrastructure.

Some embodiments disclosed herein are directed to a method of injecting hydrogen into a natural gas pipeline. In some embodiments, the method includes (a) receiving a minimum energy output for fuel combusted at an end-use location connected to the natural gas pipeline. In addition, the method includes (b) determining a blend ratio for a blended fuel comprising hydrogen and natural gas so that the blended fuel (i) has a lower carbon intensity (CI) than a natural gas stream flowing in the natural gas pipeline, and (ii) provides at least the minimum energy output when combusted at the end-use location. Further, the method includes (c) adjusting a position of a control valve of a hydrogen injection assembly connected to the natural gas pipeline upstream of the end-use location based at least in part on the blend ratio, thereby to mix hydrogen into the natural gas pipeline and produce the blended fuel.

Some embodiments disclosed herein are directed to a system for injecting hydrogen into a natural gas pipeline that is connected to an end-use location. In some embodiments, the system includes a hydrogen injection assembly connected to a source of hydrogen and connected to the natural gas pipeline upstream of the end-use location. The hydrogen injection assembly includes a hydrogen injection line and a control valve positioned on the hydrogen injection line. In addition, the system includes a controller communicatively connected to the control valve. The controller is configured to receive a minimum energy output for fuel combusted at the end-use location. In addition, the controller is configured to determine a blend ratio for a blended fuel comprising hydrogen and natural gas so that the blended fuel (i) has a lower carbon intensity (CI) than a natural gas stream flowing through the natural gas pipeline, and (ii) provides at least the minimum energy output when combusted at the end-use location. Further, the controller is configured to adjust a position of the control valve based at least in part on the blend ratio, thereby to mix hydrogen into the natural gas pipeline and produce the blended fuel.

Some embodiments disclosed herein are directed to a method for producing a blended fuel comprising hydrogen and natural gas for an end-use location. In some embodiments, the method includes (a) determining one or more energy output requirements for fuel combusted at the end-use location or a targeted minimum energy output of a fuel specification for an end-use location, (b) determining one or more characteristics of a natural gas stream in a pipeline connected to the end-use location, and (c) determining one or more characteristics of a hydrogen stream. In addition, the method includes (d) determining a blend ratio of hydrogen to natural gas for the blended fuel based at least partially on one or more of (i) the one or more energy output requirements or the targeted minimum energy output of a fuel specification for an end-use location, (ii) the one or more characteristics of the natural gas stream, and (iii) the one or more characteristics of the hydrogen stream. Further, the method includes (e) adjusting a position of a control valve of a hydrogen injection assembly connected to the pipeline based on the blend ratio to mix the hydrogen stream and the natural gas stream in the pipeline, thereby to form the blended fuel.

Some embodiments disclosed herein are directed to a system for injecting hydrogen into a natural gas pipeline connected to an end-use location. In some embodiments, the system includes a hydrogen injection assembly connected to a source of hydrogen and connected to the natural gas pipeline upstream of the end-use location. The hydrogen injection assembly includes a hydrogen injection line and a control valve positioned on the hydrogen injection line. In addition, the system includes a controller communicatively connected to the control valve, the controller configured to adjust a position of the control valve to adjust an amount of hydrogen injected into the natural gas pipeline, thereby to form a blended fuel in the natural gas pipeline based at least in part on one or more of: an energy output requirement for fuel combusted at the end-use location; a characteristic of a natural gas stream flowing in the natural gas pipeline; or a characteristic of a hydrogen stream flowing through the hydrogen injection line.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those having ordinary skill in the art upon reading the following detailed description, and by referring to the accompanying drawings. It should be appreciated that this disclosure may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various embodiments, reference will now be made to the accompanying drawings in which.

DETAILED DESCRIPTION

Figure 1:
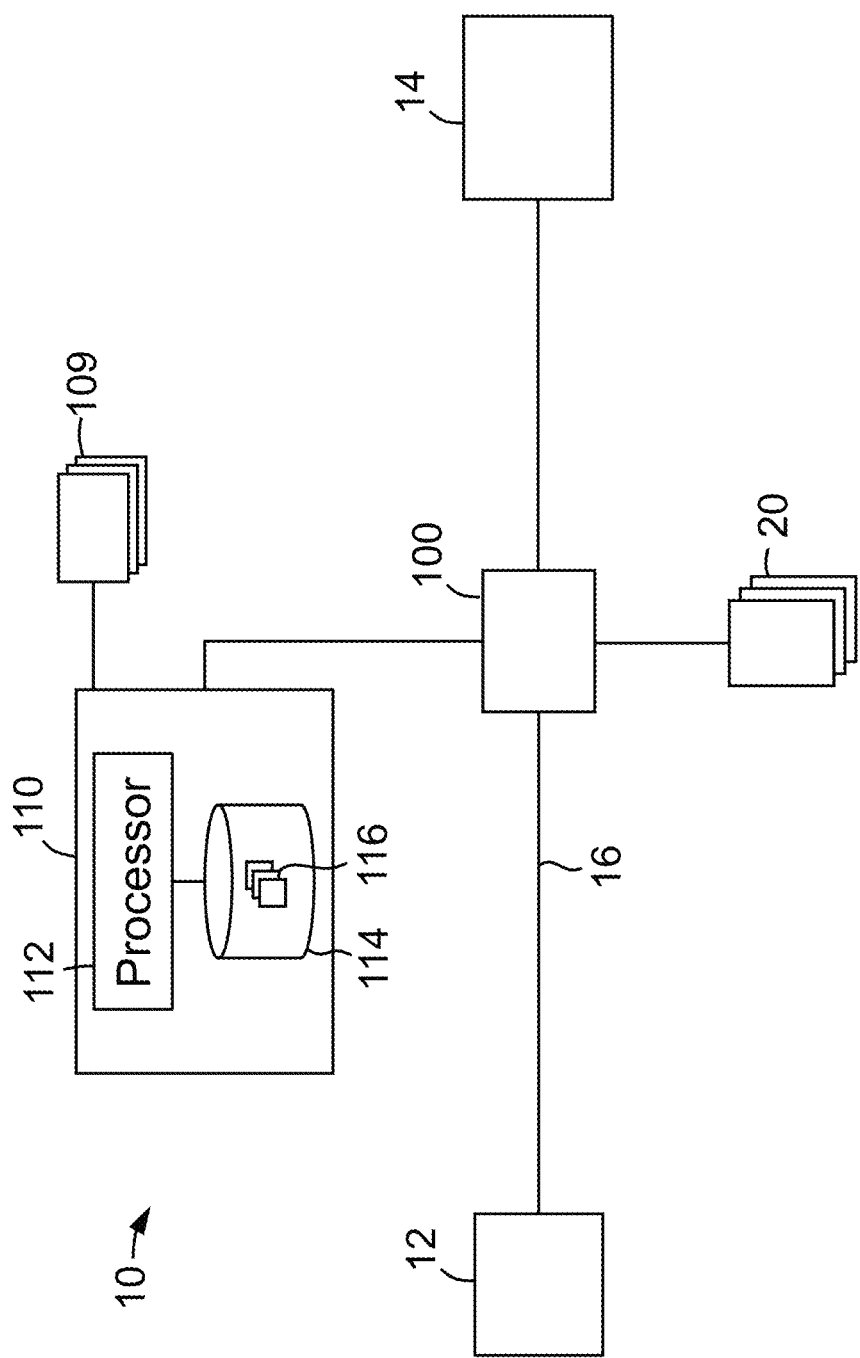
FIG. 1 is a schematic diagram of a system for mixing hydrogen into a stream of natural gas according to some embodiments disclosed herein.

As previously described, there is a desire to reduce carbon emissions (which may be quantified via carbon intensity (CI)) associated with available combustible fuel sources. Natural gas is a heavily utilized fuel source that includes an established infrastructure of pipelines to facilitate efficient delivery to end users. However, the combustion of natural gas is associated with carbon emissions.

Therefore, embodiments disclosed herein include systems and methods for reducing a density of carbon in a natural gas stream by injecting and mixing hydrogen therein. Injecting hydrogen into the natural gas stream may lower the density of carbon therein so that subsequent combustion of the natural gas stream may enjoy reduced carbon emissions. In addition, some embodiments of the systems and methods described herein for injecting hydrogen into the natural gas stream may largely utilize the existing extensive network of natural gas pipelines so that additional infrastructure investment may be minimized.

However, while hydrogen can be a useful dilutant for decarbonizing a natural gas stream, the injected hydrogen may cause additional challenges for downstream equipment and infrastructure. For instance, hydrogen can cause some materials (such as metals) to become brittle. In addition, hydrogen containment is prone to leaks due to the relatively small size of hydrogen molecules. Further, while combustible, hydrogen may have combustion characteristics (such as flame quality, combustion temperature, heat content, among others) that are not compatible with certain systems or equipment. Specifically, the combustion hydrogen may have as little as one-third the energy output of natural gas. "Energy output" or "Energy content" is a parameter for quantifying the amount of energy that may be obtained from the combustion of a particular fuel and is typically measured in units of energy (such as joules (J), British thermal units (BTU), and/or other units as will be understood by one skilled in the art) per volume of fuel. As a result, the amount of hydrogen that may be injected into a natural gas stream may vary greatly depending on the intended use of the natural gas as well as the downstream equipment and infrastructure.

Accordingly, rather than supplying a set volume of hydrogen into a natural gas stream over a specific time period, embodiments disclosed herein are configured to actively and precisely control the amount of injected hydrogen (for example, a flow rate or a volume of hydrogen per specified time period) based on a variety of system inputs. For instance, embodiments disclosed herein may determine a desired, targeted, or selected blend ratio of hydrogen to natural gas based on a variety of factors such as the energy output requirements for fuel combusted at the end-use location or the targeted energy output (such as a targeted minimum energy output and/or a targeted maximum energy output) of a fuel specification for an end-use location, the end-use location's infrastructure, combustion composition and amounts at an end-use location, one or more characteristics of the natural gas stream, and/or one or more characteristics of the injected hydrogen stream. Thus, through use of the embodiments disclosed herein, a precise amount of hydrogen may be mixed into a natural gas stream to lower carbon emissions, while simultaneously avoiding (or reducing) any potential negative impacts associated with the inclusion of the hydrogen for each particular end-use location.

FIG. 1 shows a system 10 for mixing hydrogen into a stream of natural gas according to some embodiments. The natural gas may be routed through a natural gas pipeline 16 (or more simply "pipeline 16") from a source 12 to an end-use location 14. The natural gas stream flowing in pipeline 16 may comprise a mixture of hydrocarbon molecules and other constituents. Primarily, the natural gas stream in pipeline 16 may comprise methane and potentially ethane and propane; additional constituents may include carbon dioxide, nitrogen, hydrogen sulfide, and helium, among others.

The pipeline 16 may comprise a singular pipeline or a network of connected pipelines that connect the source 12 to the end-use location 14. The source 12 may comprise any suitable source of natural gas, such as, for instance, a subterranean wellbore, a tank, a processing unit (such as a processing unit at a refinery or chemical plant), and/or another pipeline or pipeline network, among other sources. The end-use location 14 may comprise a location or system where the natural gas is used (such as combusted as a fuel). For instance, the end-use location 14 may include an industrial facility, a business, a home, or any other suitable location, system, or facility that may use natural gas as a fuel source (or for any other purposes).

A hydrogen injection assembly 100 (or more simply "injection assembly 100") may be connected to the pipeline 16 between the source 12 and end-use location 14. As a result, the injection assembly 100 is positioned upstream of the end-use location 14 and downstream of the source 12 along the pipeline 16. The injection assembly 100 is connected to one or more hydrogen sources 20, which may include any one or more suitable sources of pure (or substantially pure) hydrogen. For instance, in some embodiments, the hydrogen source(s) 20 may comprise a hydrogen generating or processing facility or a component or unit therein (such as a steam-methane reformer, an electrolyser, a catalytic reactor, or other hydrogen-producing system). In some embodiments, one or more of the hydrogen source(s) 20 may comprise a tank or other storage device (including a mobile storage device or skid) that contains a volume of hydrogen therein. As will be described in more detail herein, the injection assembly 100 may inject and mix hydrogen into the natural gas stream flowing in pipeline 16 to form a blended fuel that has a desired, selected, or targeted blend ratio of hydrogen to natural gas therein.

The injection assembly 100 may also include or be connected to a controller 110 that is configured to control an amount of hydrogen injected and mixed into the pipeline 16 based on a number of inputs or factors. The controller 110 may be communicatively connected to one or more components of the injection assembly 100 (such as one or more control valves, sensors, meters, isolation valves, and/or other components of the injection assembly 100). For instance, controller 110 may be connected to the one or more components of the injection assembly 100 via a wired connection (including metallic wire, fiber-optic cable, or other cabled or wired connection), a wireless connection (including radio-frequency communication, Wi-Fi, near field communication, BLUETOOTH®, infrared communication, or other wireless communication method or protocol), or some combination thereof. Thus, controller 110 may be located proximate to (such as "onsite" with) the one or more components of the injection assembly 100 or may be located remote (such as in a different city, region, state, and/or country) from the one or more components of the injection assembly 100.

Generally speaking, the controller 110 may be a computing device (or a collection of computing devices), such as a computer, tablet, smartphone, server, other computing device or system. Thus, controller 110 may include a processor 112 and a memory 114. The processor 112 may include any suitable processing device or a collection of processing devices. In some embodiments, the processor 112 may include a microcontroller, central processing unit (CPU), graphics processing unit (GPU), timing controller (TCON), scaler unit, or some combination thereof. During operations, the processor 112 executes machine-readable instructions (such as machine-readable instructions 116) stored on memory 114, thereby causing the processor 112 to perform some or all of the actions attributed herein to the controller 110. In general, processor 112 fetches, decodes, and executes instructions (for example, machine-readable instructions 116). In addition, processor 112 may also perform other actions, such as, making determinations, detecting conditions or values, and/or communicating signals. If processor 112 assists another component in performing a function, then processor 112 may be said to cause the component to perform the function.

The memory 114 may be any suitable device or collection of devices for storing digital information including data and machine-readable instructions (such as machine-readable instructions 116). For instance, the memory 114 may include volatile storage (such as random-access memory (RAM)), non-volatile storage (for example, flash storage, read-only memory (ROM), and/or other types of non-volatile storage), or combinations of both volatile and non-volatile storage. Data read or written by the processor 112 when executing machine-readable instructions 116 can also be stored on memory 114. Memory 114 may include "non-transitory machine-readable medium," where the term "non-transitory" does not include or encompass transitory propagating signals.

The processor 112 may include one processing device or a plurality of processing devices that are distributed within controller 110 or within multiple controllers or other computing devices. Likewise, the memory 114 may include one memory device or a plurality of memory devices that are distributed within controller 110 or within multiple controllers or other computing devices.

The controller 110 may be communicatively connected (such as via wired and/or wireless connection as previously described) to one or more user interfaces 109 (such as a monitor, display, computing device, touch-sensitive screen or other surface, keyboard, mouse, or some combination thereof). As a result, a user may view or receive information output from the controller 110 via the user interface(s) 109. In addition, a user may make inputs to the controller 110 via the user interface(s) 109 (such as commands to manipulate one or more components of the assembly 100 to effect or adjust the injection and mixing of hydrogen into the pipeline 16).

During operations, the controller 110 may manipulate the one or more valves or flow control devices of the injection assembly 100 so as to adjust an amount of hydrogen that is mixed into the natural gas flowing through pipeline 16 to form the blended fuel (for example, the selected hydrogen concentration in the natural gas). For instance, the controller 110 may adjust the amount of hydrogen that is mixed or injected into the pipeline 16 to achieve a desired, selected, or targeted blend ratio of hydrogen to natural gas within the blended fuel. The blend ratio may be selected based on a variety of factors such as the energy output requirements for fuel combusted at the end-use location, the end-use location's infrastructure, one or more characteristics of the natural gas stream, and/or one or more characteristics of the injected hydrogen stream. In some embodiments, the particular blend ratio for an end-use location 14 may be selected to provide an acceptable energy output value for the blended fuel (based on the operational requirements at the end-use location 14, the equipment type, and/or condition at the end-use location 14) while minimizing the carbon emissions (or CI) associated with the blended fuel (that is, lowering the CI of the blended fuel relative to the CI of the natural gas stream).

In some embodiments, the desired, targeted, or selected blend ratio may be selected (such as selected as by the controller 110 and/or a user) based at least partially on the energy output requirements for fuel combusted at the end-use location 14 or a targeted energy output (such as a targeted minimum energy output and/or a targeted maximum energy output) of a fuel specification for an end-use location 14. For instance, a particular end-use location 14 may specify, indicate, and/or include a specification indicating a minimal amount of heat or energy from the combustion of the blended fuel. In some examples, the end-use location 14 may include a furnace for heating a home, business, or other defined space, which may specify, indicate, and/or include a specification indicating a minimal amount of thermal energy output from the combusted fuel to function within design parameters. In another example, the end-use location 14 may include a gas-fired engine (such as a gas-fired turbine) that may specify, indicate, and/or include a specification indicating a minimal amount of output energy from combusting the blended fuel to drive the connected load (which may be a pump, compressor, driveshaft, or other suitable load connected to the engine).

In some embodiments, the desired, targeted, or selected blend ratio may be selected (again, selected by the controller 110 and/or a user) based at least partially on the infrastructure of the end-use location 14. As previously described, hydrogen exposure, especially to increased concentrations of hydrogen, may cause some metals to become more brittle over time, and hydrogen may be more likely to leak from some sealing assemblies due at least in part to the small size of the hydrogen molecule itself. Thus, the characteristics of the infrastructure (or "infrastructure characteristics") utilized in or at the end-use location 14, including the pipe/tubing materials, seal designs, seal materials, equipment designs and/or appliance designs, as well as the age and/or condition of such infrastructure, may be factors utilized to determine the amount of hydrogen that may be injected into the natural gas to form the blended fuel.

In some embodiments, the desired, targeted, or selected blend ratio may be selected (again, selected by the controller 110 and/or a user) based at least partially on one or more characteristics of the natural gas stream and/or the injected hydrogen stream. For instance, the compositional make-up of the natural gas stream in the pipeline 16 and/or the compositional makeup of the hydrogen stream provided from hydrogen source(s) 20 may affect the blend ratio of the final blended fuel. In some circumstances, the natural gas in the pipeline 16 may already contain an amount of hydrogen therein. In addition, the natural gas may include other components that may combine with the injected hydrogen to form undesirable by-products (such as hydrogen-sulfide which may be corrosive to some materials when dissolved into an aqueous solution). Similarly, the hydrogen injected into the natural gas stream may not be pure and/or may include other components therein that may be undesirable in higher concentrations in the blended fuel. As will be understood by those of skill in the art, the hydrogen purity of the hydrogen from hydrogen source 20 may be utilized (for example, by the controller 110 and/or the user) to determine, at least in part, the rate of the hydrogen injection into the natural gas stream to achieve the desired blend ratio. For example, a less pure hydrogen stream may require a greater flow rate or rate of injection to achieve the same blend ratio as compared to a more pure hydrogen stream. Therefore, consideration of the characteristics (including composition, pressure, flow rate, and/or temperature) of the natural gas stream and hydrogen stream may influence the desired, targeted, or selected blend ratio for the blended fuel.

In another embodiment, the desired, targeted, or selected blend ratio may be selected (again, selected by the controller 110 and/or a user) based at least partially on emissions produced via combustion of the blend at the end-use location. In some embodiments, an end-use location may require the output control of selected emissions, for example, nitrogen oxides (NOx), sulfur oxides ($SO_x$), and/or other gases and/or particulates. In such an example, the controller 110 may receive combustion characteristics and specifications from an end-use location. The end-use location (for example via one or more sensors and/or analyzers), as combustion of the blend occurs, may measure or capture the composition of emissions. As noted, hydrogen and/or natural gas may vary in purity. Thus, as hydrogen to natural gas increases in the blend ratio, or vice versa as the case may be, the amount of selected gases and/or particulates in the emissions may increase. The end-use location may provide data indicative of emissions to the controller 110. The controller 110 may then adjust the amount of hydrogen and/or natural gas included in the blend ratio based in part on that data. Further, the controller 110 may utilize analysis of the hydrogen and/or natural gas to determine which to increase/decrease based on certain chemicals and/or compounds included therein to decrease the emission of selected gases and/or particulates produced via combustion.

Figure 2:
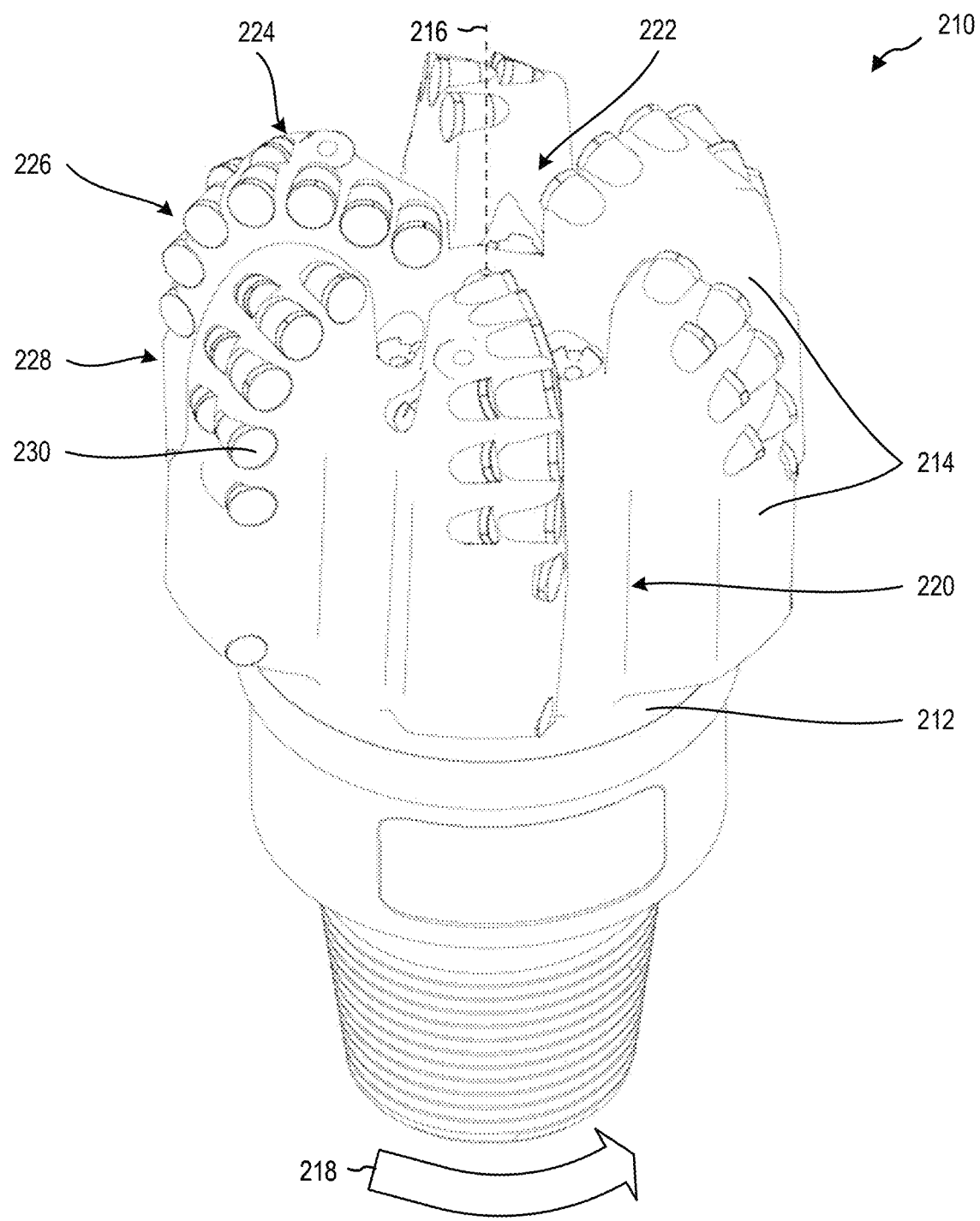
FIG. 2 is a schematic diagram of the system of FIG. 1 that further illustrates details of a hydrogen injection and mixing assembly according to some embodiments disclosed herein.

FIG. 2 shows a schematic diagram of an embodiment of the system 10 of FIG. 1 and illustrates further details of the hydrogen injection assembly 100 according to some embodiments. As shown, the injection assembly 100 may include a hydrogen injection line 22 that is connected to the one or more hydrogen sources 20 and the pipeline 16. In particular, the hydrogen injection line 22 is connected to the pipeline 16 at an intersection 23. A hydrogen compressor 102 may be positioned along the hydrogen injection line 22. Likewise, the pipeline 16 may also include a natural gas compressor 18 that is positioned upstream of the intersection 23. The compressors 102, 18 may be utilized to ensure a suitable pressure of the hydrogen and natural gas to facilitate injection of the hydrogen into the pipeline 16 and adequate mixing thereof. For instance, the pressure of the hydrogen (via hydrogen compressor 102) may be higher than that of the natural gas flowing through pipeline 16 (particularly at intersection 23) to ensure that the hydrogen is blended into the natural gas in the pipeline 16 during operations. In addition, the line pressure of the blended natural gas and hydrogen in the pipeline 16, downstream of intersection 23, may be determined based on the needs or requirements of the end-use location 14 or a targeted energy output (such as a targeted minimum energy output and/or a targeted maximum energy output) of a fuel specification for an end-use location 14, and the compressors 102, 18 may be configured accordingly.

A plurality of valves are positioned throughout the assembly 100 and pipeline 16 in order to control the injection of hydrogen and effect the blend ratio of the blended fuel during operations. For instance, the hydrogen injection line 22 includes a control valve 104, a check valve 106, and isolation valve 108 positioned between the hydrogen compressor 102 and intersection 23. In addition, another control valve 146 may be positioned on a bypass line 17 that is connected to the pipeline 16 at a first intersection 21 and at a second intersection 25. The first intersection 21 (or point) is positioned on the pipeline 16 downstream of the natural gas compressor 18 and upstream of the intersection 23, while the second intersection 25 (or point) is positioned on the pipeline 16 downstream of the intersection 23 and upstream of the end-use location 14.

The control valves 104, 146 may each be adjusted or actuated (such as by controller 110, manually, or a combination thereof) to a fully closed position, a fully open position, and a plurality of positions between the fully closed and fully open positions. The control valve 104 may be adjusted or actuated to affect the amount or flow rate of hydrogen that is passed into the pipeline 16 via the hydrogen injection line 22 and intersection 23. In addition, the control valve 146 may be adjusted or actuated to selectively bypass natural gas around the intersection 23 so as to dilute the blended fuel stream with natural gas (in other words, increase the amount of natural gas relative to hydrogen in the blended stream to mitigate an excess amount of hydrogen injected via intersection 23).

Figure 7:
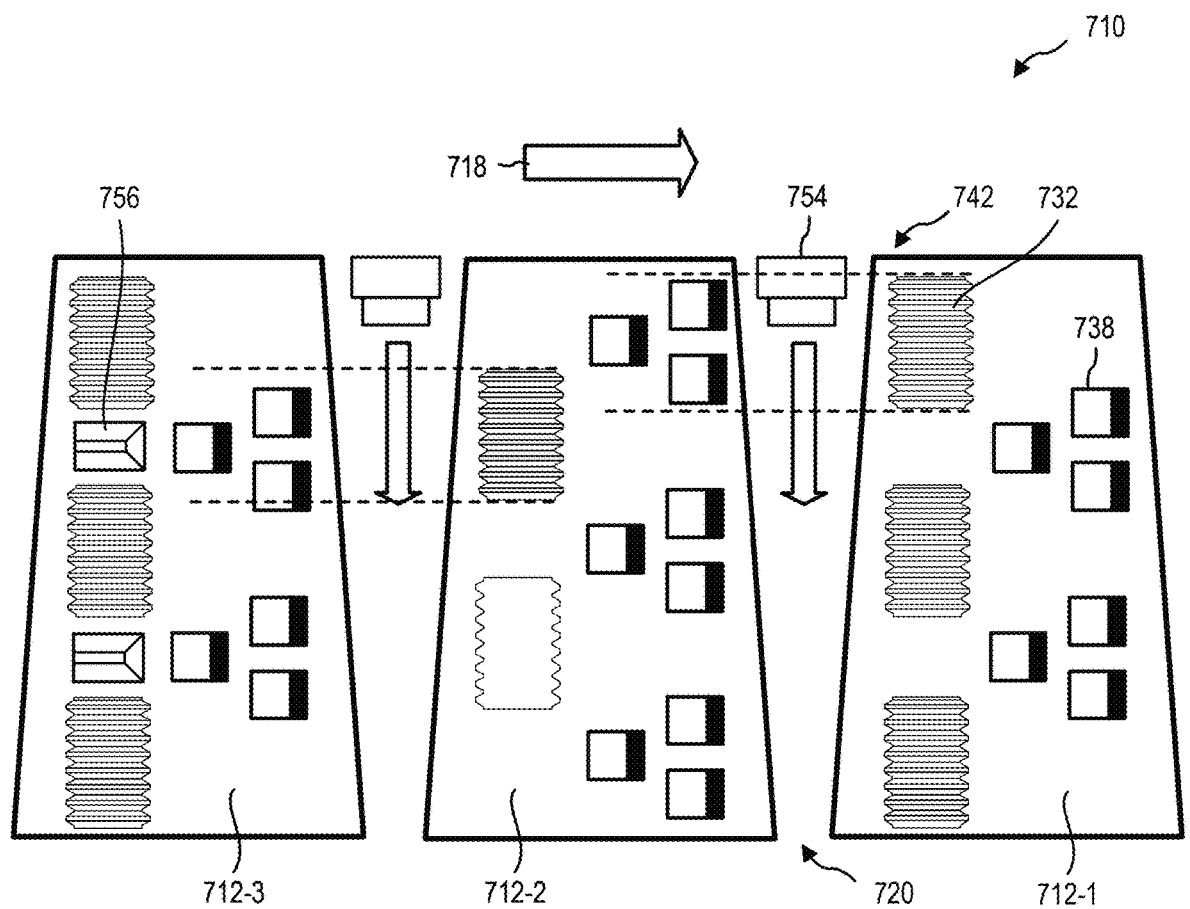
FIG. 7 is a schematic diagram of the system of FIG. 1 that further illustrates details of another embodiment of a hydrogen injection and mixing assembly according to some embodiments disclosed herein.
Figure 8:
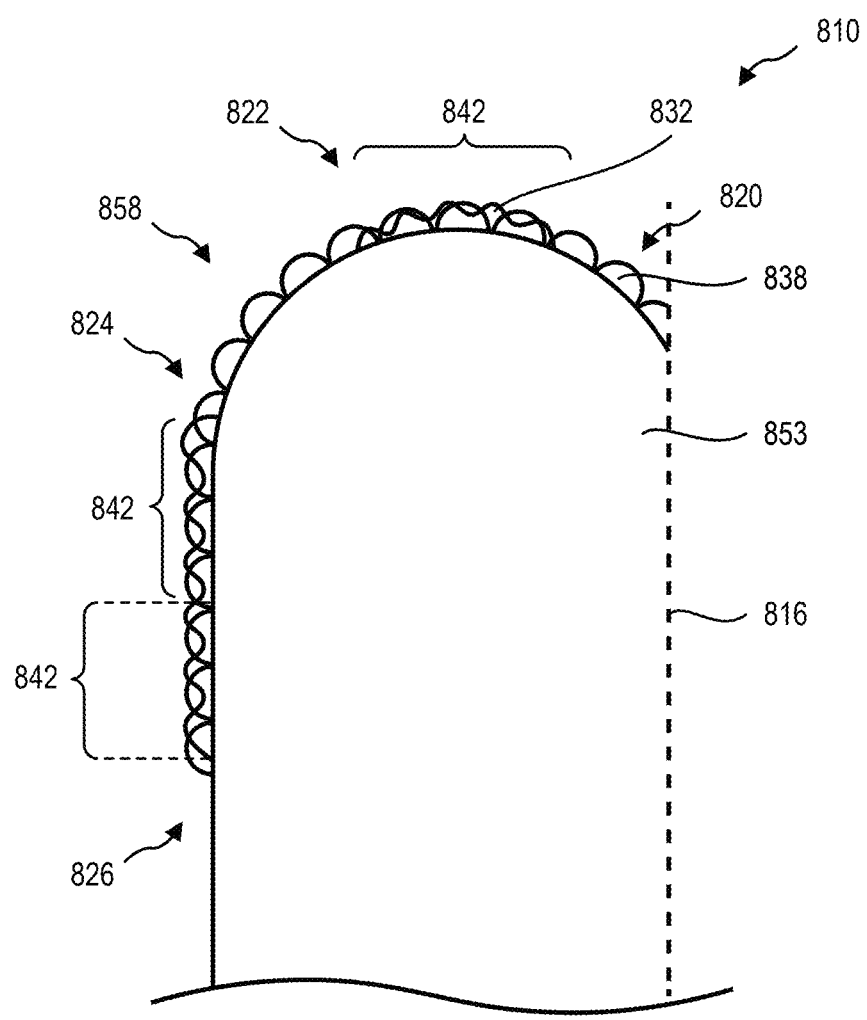
Figure 2:
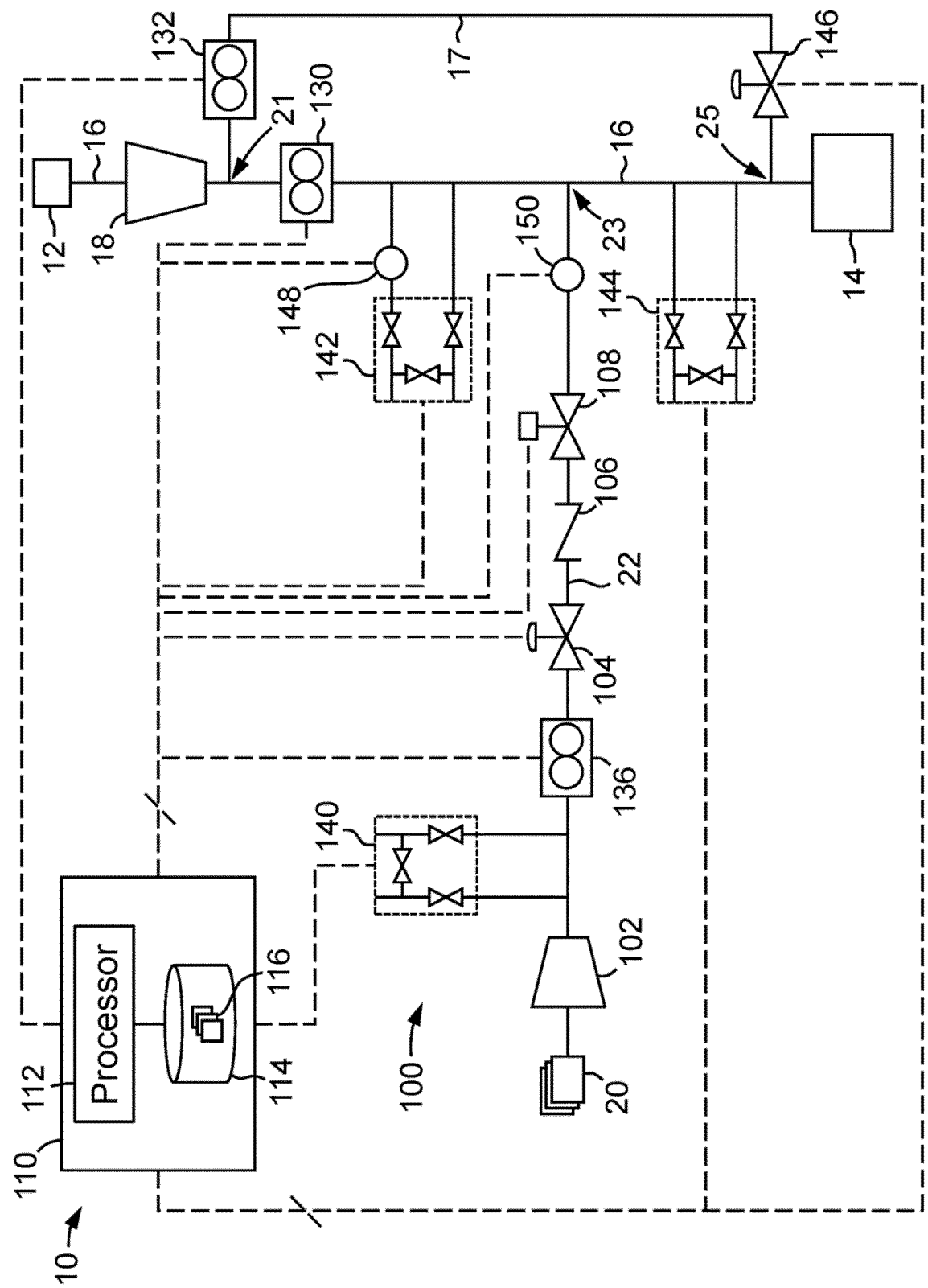
Figure 3:
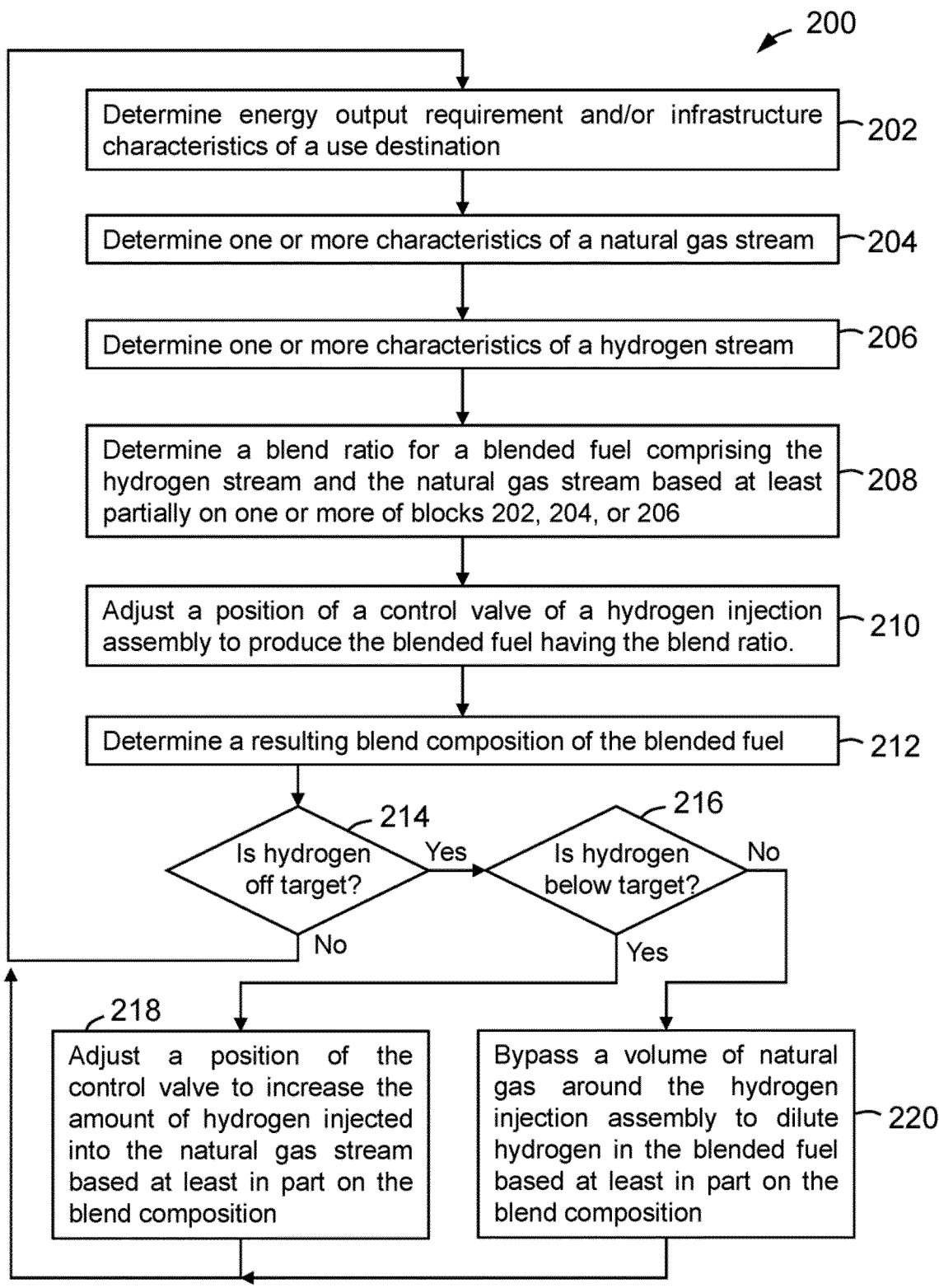
Figure 4:
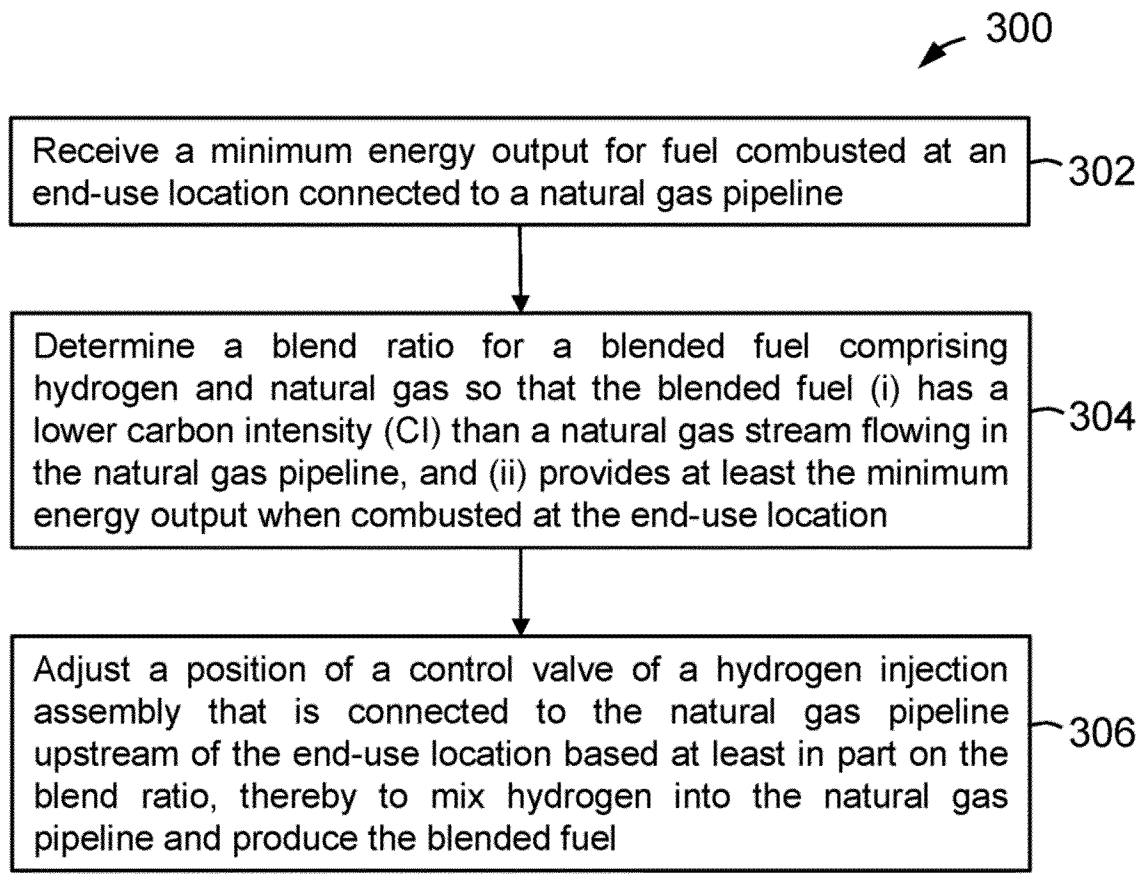
Figure 5:
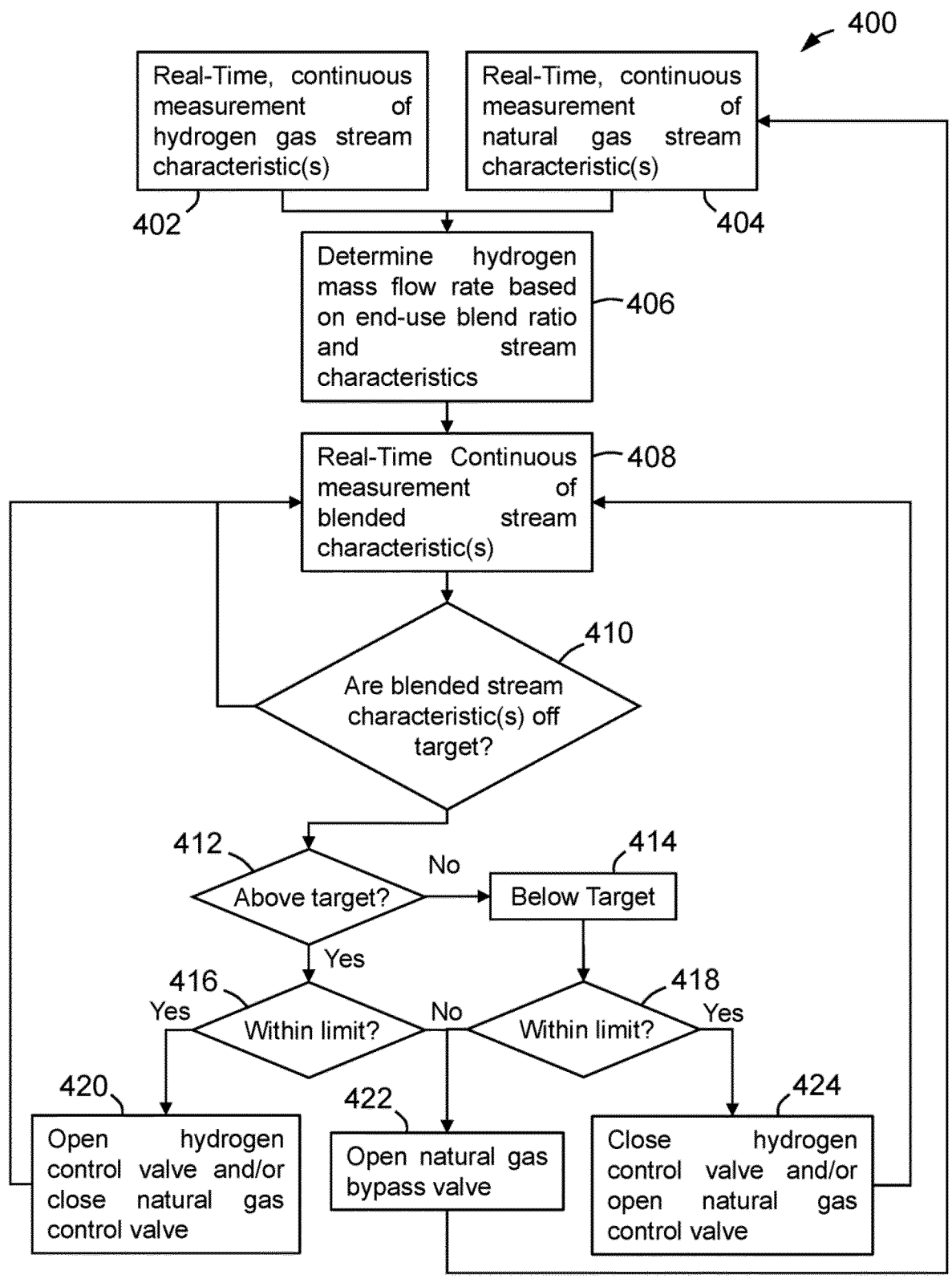
Figure 6:
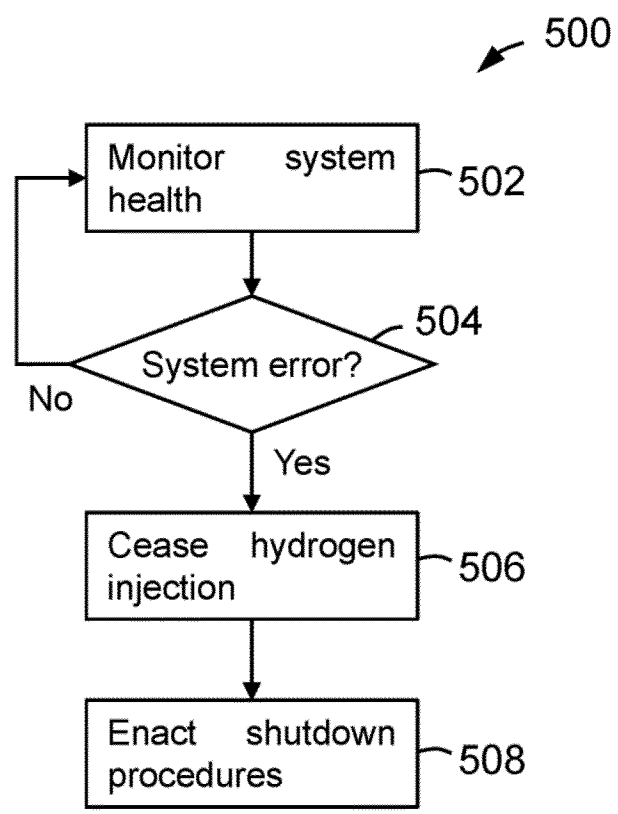
Figure 7:
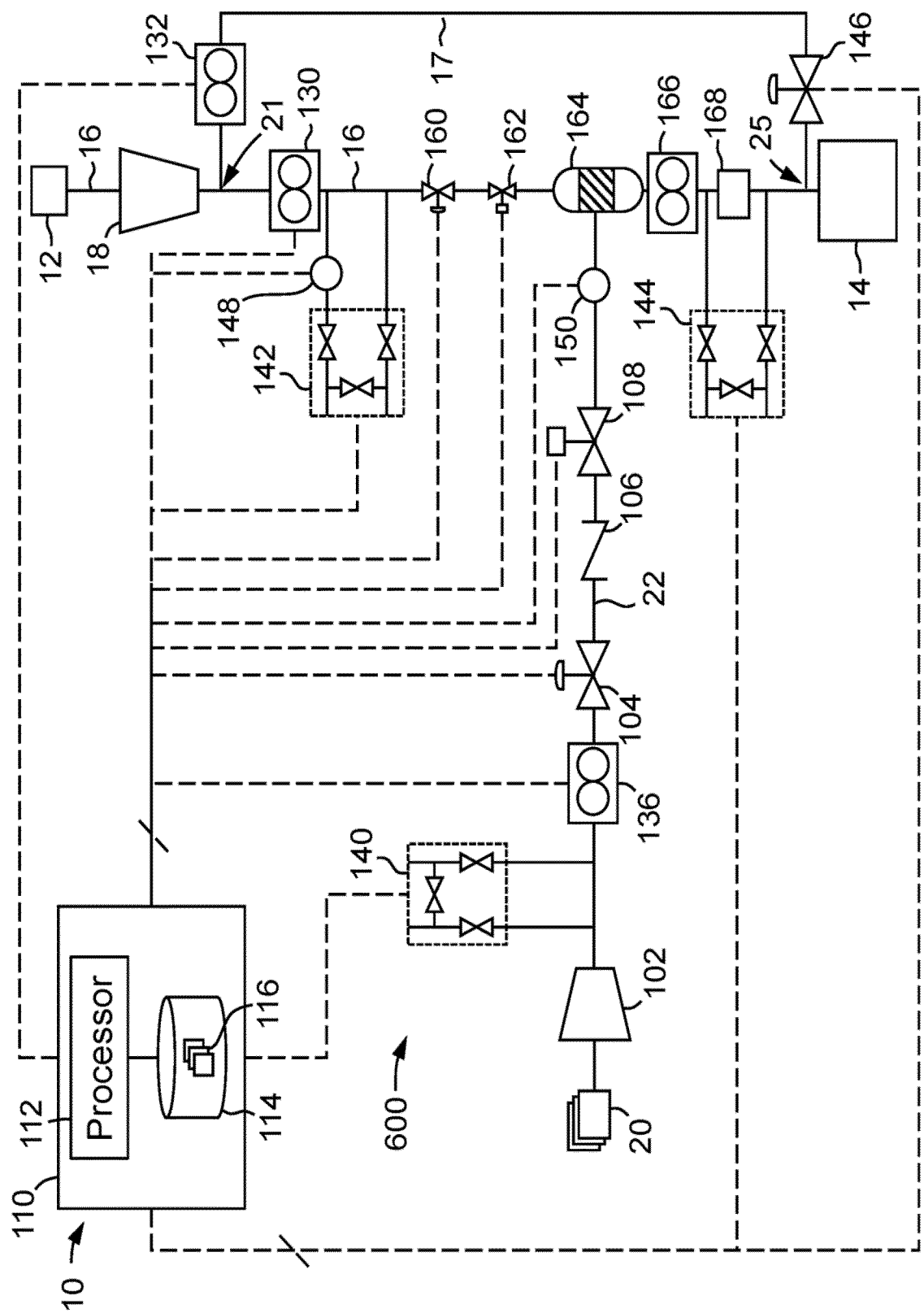

In another embodiment, rather than or in addition to dilution of the hydrogen in the natural gas stream, a separator 168 (for example, as illustrated in FIG. 7) may be positioned downstream of intersection 23 in pipeline 16 and proximate a sensor or meter 166, to separate the hydrogen or an amount of hydrogen from the natural gas stream. In such embodiments, the separator 168 may be connected to the pipeline via separate pipeline and/or one or more valves, thus, all or a portion of the hydrogen and natural gas stream may be diverted to and/or bypass the separator 168. In another embodiment, one or more separators may be positioned at various locations along the pipeline 16. In an embodiment, the separator 168 may be a pressure swing adsorber or a hydrogen separation membrane. For example, if the separator includes a pressure swing adsorber, then the blended stream or a portion of the blended stream may flow through or be re-directed to flow through the pressure swing adsorber. The pressure swing adsorber may include adsorbents selected to adsorb the hydrogen or the natural gas from the blended stream. Thus, as the blended stream flows through the pressure swing adsorber, hydrogen or natural gas may be captured by the adsorbent and separated from the blended stream. In another example, a hydrogen separation membrane may be utilized and may include a membrane configured to allow hydrogen to permeate therethrough, thus separating the hydrogen from the natural gas.

In yet another embodiment, the controller 110 may divert an amount of the hydrogen and natural gas stream (for example, a slipstream) to the separator 168 based on a threshold amount or concentration of hydrogen selected by the end-use location 14, thus enabling the separator 168 to remove an amount of hydrogen to cause the total amount or concentration of hydrogen in the hydrogen and natural gas stream to fall below the threshold. As described herein below, the third sampling assembly 144 (or, in other embodiments, the first sampling assembly 140, the second sampling assembly 142, or another sampling assembly, based upon placement of the separator 168) may determine the amount or concentration of hydrogen in the hydrogen and natural gas stream (the hydrogen and natural gas stream forming, for example, a blended fuel). In another embodiment, the hydrogen removed from the hydrogen and natural gas stream via the separator 168 may be stored in a tank or other storage device (including a mobile storage device or skid) positioned proximate the separator 168.

The check valve 106 may be configured to allow hydrogen to flow along hydrogen injection line 22 toward the intersection 23, but not along hydrogen injection line 22 toward the hydrogen source(s) 20. For instance, in some embodiments, the check valve 106 may include a flapper, gate, or other valving member that closes when a pressure along the hydrogen injection line 22 downstream of the check valve 106 (such as between the check valve 106 and intersection 23) is higher than the pressure along hydrogen injection line 22 upstream of the check valve 106 (such as between check valve 106 and hydrogen source 20).

The isolation valve 108 may be adjusted (again, such as by controller 110, manually, or some combination thereof) between a fully closed position, a fully open position, and a plurality of positioned between the fully closed position and the fully open position. In some embodiments, the isolation valve 108 may be transitioned to the fully closed position to prevent the flow of hydrogen along the hydrogen injection line 22 and into the pipeline 16 via the intersection 23.

A plurality of sampling assemblies are positioned through the injection assembly 100 and pipeline 16 to determine the compositions and/or concentrations of fluids therein. For instance, a first sampling assembly 140 is positioned on the hydrogen injection line 22 downstream of the compressor 102 and upstream of the control valve 104. In addition, a second sampling assembly 142 is positioned on the pipeline 16 between the first intersection 21 and the intersection 23. Further, a third sampling assembly 144 is positioned on the pipeline 16 between the intersection 23 and the second intersection 25. While the sampling assemblies 140, 142, 144 are shown positioned within/on the pipeline 16, these assemblies could be positioned about a slip stream configured with respect to pipeline 16 to measure the characteristics of the fluid passing through pipeline 16.

Each of the sampling assemblies 140, 142, 144 may be configured to selectively obtain a sample of fluid and may include one or more sensors, devices, or systems that are configured to perform a compositional analysis on the obtained sample of fluid during operations. For instance, in some embodiments one or more of the sampling assemblies 140, 142, 144 may each include a gas chromatograph, a mass spectrometer, a Raman effect analyzer, a refractometer, a piezoelectric absorption meter, and/or a ultraviolet absorption meter that are configured to determine a compositional makeup and/or other characteristic of a sample during operations. In addition, the sampling assemblies 140, 142, 144 may each include valves, tubing, or other components that may be used to selectively capture a sample of fluid that may then be analyzed for composition, concentrations, or other qualities as previously described. Further, sampling assemblies 140, 142, 144 may include additional sensors or other devices for determining additional characteristics of the corresponding fluid, such as, for instance, pressure, temperature, PH, density, specific gravity, and/or viscosity among others.

A plurality of flow meters or flow rate sensors may also be distributed throughout the injection assembly 100 and pipeline 16 to determine flow rates of various fluids therein. For instance, a first flow meter 130 may be positioned along pipeline 16 between the first intersection 21 and the second sample assembly 142. In addition, a second flow meter 132 may be positioned along the bypass line 17. Further, a third flow meter 136 is positioned along the hydrogen injection line 22 between the first sampling assembly 140 and the control valve 104. The flow meters 130, 132, 136 may include any suitable flow meter or flow sensor for determining a flow rate of a fluid (or a value indicative thereof). For instance, in some embodiment, the flow meters 130, 132, 136 may comprise differential pressure flow meters, Coriolis flow meters, ultrasonic flow meters, turbine flow meters, mass flow meters, and/or other types of flow meters.

Additional sensors or meters may also be included within the and about the injection assembly 100 and pipeline 16. For instance, as shown in FIG. 2, a pressure sensor 148 may be connected to the pipeline 16 and/or second fluid sampling assembly 142 that is configured to determine a pressure (or value indicative thereof) of the natural gas in the pipeline 16 upstream of the intersection 23. In addition, another pressure sensor 150 may be connected to the hydrogen injection line 22. The pressure sensor 150 may be positioned upstream or downstream of the control valve 104. In the embodiment illustrated in FIG. 2, the pressure sensor 150 is positioned downstream of the control valve 104 and thus between the control valve 104 and intersection 23.

The controller 110 may be connected (such as communicatively connected via wired or wireless connection as previously described) to the control valves 104, 146 and isolation valve 108 so that the controller 110 may control the flow of fluid (such as natural gas and hydrogen respectively) through the pipeline 16 and injection assembly 100 during operations. Specifically, the controller 110 may actuate the isolation valve 108 to the open position and then may selectively adjust the position of the control valve 104 so as to inject hydrogen into the pipeline 16 via the intersection 23 to achieve a desired, targeted, or selected blend ratio of the blended fuel as previously described. In addition, the controller 110 may adjust a position of the control valve 146 to selectively bypass natural gas around the intersection 23 to dilute injected hydrogen as previously described. In another embodiment, and as described above, rather than or in addition to dilution of the hydrogen within the natural gas stream, a separator 168 (for example, as illustrated in FIG. 7) may be positioned proximate a sensor or meter 166 (or, in other embodiments, at other locations along the pipeline 16), to separate the hydrogen or an amount of hydrogen from the natural gas stream.

In addition, the controller 110 may also be connected (such as communicatively connected) to each of flow meters 130, 132, 136 and sampling assemblies 140, 142, 144, so that the controller 110 may receive various inputs for purposes of determining (based at least in part on the inputs) a corresponding adjustment or position for the control valve 104 to provide the desired, targeted, or selected blend ratio. Specifically, the first flow meter 130 may produce and provide an output to the controller 110 that is indicative of a flow rate of natural gas flowing in the pipeline 16, upstream of the intersection 23. In addition, the second flow meter 132 may produce and provide an output to the controller 110 that is indicative of a flow rate of natural gas along the bypass line 17 (if any). Further, the third flow meter 136 may produce and provide an output to the controller 110 that is indicative of a flow rate of hydrogen through the hydrogen injection line 22 toward the intersection 23.

In addition, the sampling assemblies 140, 142, 144 (or a component thereof) may produce and provide outputs to the controller 110 that are indicative of the concentration, makeup or composition of the sample of fluid obtained thereby. For instance, the first sampling assembly 140 may produce and provide an output to the controller 110 that is indicative of the purity or composition of the hydrogen stream flowing along hydrogen injection line 22. In addition, the second sampling assembly 142 may produce and provide an output to the controller 110 that is indicative of the purity or composition of natural gas flowing within pipeline 16, upstream of the intersection 23. Further, the third sampling assembly 144 may produce and provide an output to the controller 110 that is indicative of the concentration or relative amount of hydrogen to natural gas in the blended fuel (which includes the natural gas and any injected hydrogen as previously described) in the pipeline 16 that is downstream of the intersection 23.

Moreover, the controller 110 may be connected (such as communicatively connected via a wired or wireless connection as previously described) to additional sensors distributed through and about the assembly 100. For instance, as shown in FIG. 2, the controller 110 may be connected to each of the pressure sensors 148, 150, so that the pressure sensors 148, 150 may produce and provide outputs to the controller 110 that are indicative of the pressures within the pipeline 16 and line 22, respectively.

During operations, the controller 110 may adjust the position of the control valve 104 to allow a desired, targeted, or selected amount of hydrogen to progress or flow from the hydrogen source(s) 20 to the intersection 23 and thereby mix with the natural gas flowing in the pipeline 16 to provide the blended fuel as previously described. The hydrogen may mix with the natural gas within the pipeline 16 downstream of the intersection 23 so that the injection assembly 100 and system 10 may be configured to perform a so-called "in-line" mixing of the hydrogen and natural gas during operations.

As is also previously described, the desired, targeted, or selected blend ratio of hydrogen to natural gas may be selected based on a variety of factors (such as those described above). The controller 110 may continuously or substantially continuously adjust the positions of the control valves 104, 146 during the above-described operations based on additional inputs or measurements from within the assembly 100 and/or the pipeline 16 so as to achieve and/or provide the desired, targeted, or selected blend ratio of the blended fuel for the end-use location 14. For instance, the controller 110 may open or close the control valve 104 based on an output from one or more of the sampling assemblies 140, 142, 144 and/or, in some embodiments, the outputs from the flow meters 130, 136 and/or pressure sensors 148, 150. Specifically, if the flow rate or pressure of either the natural gas or hydrogen is above or below an assumed or previously detected level or amount, the controller 110 may adjust the position of the valve 104, and thus the flow rate of hydrogen to the intersection 23, to thereby provide or maintain the desired, targeted, or selected blend ratio.

The controller 110 may also adjust the position of the control valves 104, 146 based on the composition of the natural gas in the pipeline 16 as indicated by the sampling assembly 142, the composition or purity of the hydrogen stream in hydrogen injection line 22 as indicated by the sampling assembly 140, or the composition of the blended fuel as indicated by the sampling assembly 144. For instance, the natural gas in pipeline 16 may already include some amount of hydrogen therein, and the controller 110 may determine the amount of existing hydrogen in the natural gas in the pipeline 16. Moreover, the composition of the natural gas (including any native hydrogen included therein) may change over time. Likewise, the hydrogen stream provided from the hydrogen source(s) 20 may have a varying level of purity over time. Thus, the controller 110 may utilize the fluid compositions determined by the sampling assemblies 140, 142 so as to determine a position of the control valve 104 that will produce a suitable flow rate of hydrogen into the pipeline 16 at intersection 23 to result in the desired, targeted, or selected blend ratio for the blended fuel to be routed to the end-use location 14.

The controller 110 may also verify the composition of the resulting blended fuel downstream of the intersection 23 via the third sampling assembly 144. If, based on the output from the third sampling assembly 144, the controller 110 determines that an insufficient amount of hydrogen has been included in the blended fuel, the controller 110 may then respond by adjusting (such as opening) the control valve 104 to inject additional hydrogen into the natural gas stream via the intersection 23. If the controller 110 determines, based on the output from the third sampling assembly 144, that too much hydrogen is included in the blended fuel, the controller 110 may actuate (such as close) the control valve 104 to reduce an amount of hydrogen injected into the natural gas via the intersection 23 and/or may actuate (such as open) the control valve 146 so as to bypass a volume of natural gas around the intersection 23 and thereby dilute the hydrogen of the blended fuel. In another embodiment, and as described above, rather than or in addition to dilution of the hydrogen in the natural gas stream, a separator 168 (for example, as illustrated in FIG. 7) may be positioned proximate the sensor or meter 166 (or, in other embodiments, at other locations along the pipeline 16), to separate the hydrogen or an amount of hydrogen from the natural gas stream.

Figure 3:
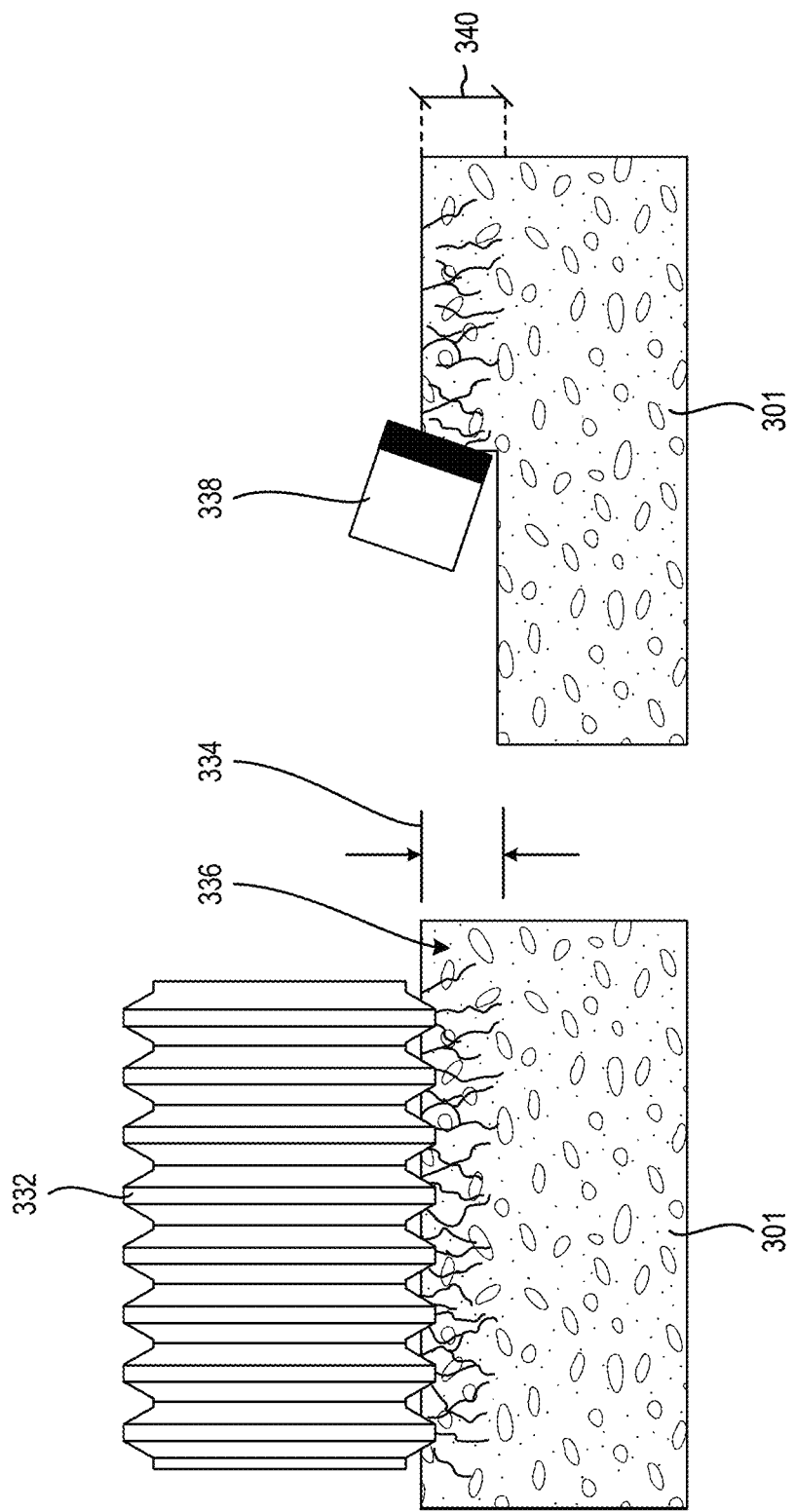
FIGS. 3-5 are block diagrams of methods for producing a blended fuel comprising hydrogen and natural gas for an end-use location according to some embodiments disclosed herein.

FIG. 3 shows an embodiment of a method 200 for producing a blended fuel comprising hydrogen and natural gas for an end-use location according to some embodiments disclosed herein. Method 200 may be practiced using the system 10 as shown in FIGS. 1 and 2. Thus, in describing the method 200, continuing reference will be made to the features of system 10 shown in FIGS. 1 and 2. However, it should be appreciated that method 200 may be practiced using different systems and assemblies (such as the hydrogen injection assembly 600 shown in FIG. 7 and described herein). Thus, reference to the system 10 of FIGS. 1 and 2 should not be interpreted as limiting all embodiments of method 200.

In addition, at least some steps of the method 200 may be performed (at least in part) using a processor of a controller or other computing device (such as the processor 112 of controller 110 shown in FIGS. 1 and 2). Thus, method 200 may be at least partially representative of machine-readable instructions that are stored on a memory and executed by the processor (such as the machine-readable instructions 116 stored on memory 114 shown in FIGS. 1 and 2).

Initially, method 200 includes determining energy output requirements and/or infrastructure characteristics of an end-use location at block 202 (for example, infrastructure characteristics including the pipe/tubing material, seal design, seal material, equipment design and/or appliance design, as well as the age and/or condition of such infrastructure). The end-use location may be similar to the end-use location 14 shown in FIGS. 1 and 2 and described herein. Thus, the end-use location of block 202 may include any location, facility, or system that will combust the blended fuel, e.g., for heat and/or to perform mechanical work. As previously described, a particular end-use location (such as end-use location 14) may have certain requirements with respect to the energy output or energy content of a combusted fuel (so that the combusted fuel provides sufficient energy either the form of heat or mechanical work), and a blended fuel including natural gas and hydrogen may provide a different energy output during combustion based on the amount of hydrogen included therein. In another embodiment, determining an energy output requirement may include obtaining or receiving a fuel specification for the end-use location. The fuel specification may include a targeted energy output (such as a targeted minimum energy output and/or a targeted maximum energy output) for a fuel to be used at or for the end-use location.

In addition, method 200 includes determining one or more characteristics of a natural gas stream at block 204 and determining one or more characteristics of a hydrogen stream at block 206. The one or more characteristics of the natural gas stream and the one or more characteristics of the hydrogen stream may include one or more of a pressure, temperature, flow rate, purity, or composition, respectively. Thus, determining one or more characteristics of the natural gas stream at block 204 and the one or characteristics of the hydrogen stream at block 206 may comprise receiving outputs from one or more sensors or assemblies that are configured to measure or detect the one or more characteristics (or values indicative thereof). For instance, for the hydrogen injection and mixing assembly 100 of FIG. 2, the controller 110 may receive outputs from the flow meters 130, 132, 136, sampling assemblies 140, 142, 144, and sensors 148, 150 to determine one or more of the above-noted characteristics of both the natural gas stream flowing in pipeline 16 and the hydrogen stream flowing in hydrogen injection line 22.

Method 200 also includes determining, at block 208, a blend ratio for a blended fuel comprising the hydrogen stream and the natural gas stream based at least partially on the determinations from one or more of the blocks 202, 204, and 206. As previously described, the blend ratio for a blended fuel for use at an end-use location may be selected and determined based on the energy output requirements for the end-use location (for example, based on a targeted minimum energy output and/or a targeted maximum energy output of a fuel specification for the end-use location), the purity or compositional makeup (or other characteristics) of the natural gas stream, and/or the purity or compositional makeup (or other characteristics) of the hydrogen stream. In some embodiments, the blend ratio may be determined at block 208 so as to provide the blended fuel with an energy output (as specified or indicated by the end-use location) while also minimizing the carbon emissions (or CI) associated therewith compared to the CI of the natural gas stream. In some embodiments, the blend ratio may be further determined at block 208 so as to avoid (or minimize) negative impact to the infrastructure of the end-use location. The blend ratio may include a range of acceptable or permissible blend ratios, e.g., between a maximum ratio of hydrogen to natural gas and a minimum ratio of hydrogen to natural gas. At a high hydrogen to natural gas ratio, the carbon intensity of the blended fuel is minimized while the energy content is also minimized. At a low hydrogen to natural gas ratio, the carbon intensity of the blended fluid is maximized while the energy content is also maximized.

Method 200 also includes adjusting a position of a control valve of a hydrogen injection assembly to produce the blended fuel having the blend ratio at block 210. For instance, block 210 may comprise adjusting a position of a control valve of the hydrogen injection assembly to inject at least a portion of the hydrogen stream into the natural gas stream so as to produce the blended fuel having the blend ratio. As was previously described for the hydrogen injection and mixing assembly 100 shown in FIG. 2, the controller 110 may select a position of the control valve 104 to achieve the selected blend ratio based on various other characteristics of the natural gas flowing in pipeline 16 and of the hydrogen flowing in hydrogen injection line 22. For instance, the controller 110 may adjust the position of the control valve 104 based on one or more of the purity, composition, pressure, or flow rate of the natural gas flowing in pipeline 16 and/or hydrogen flowing through injection line 22 via outputs from the second sampling assemblies 140, 142, sensors 148, 150, or flow meters 130, 136 as previously described.

Further, method 200 includes determining a resulting blend composition of the blended fuel at block 212. For instance, as previously described for the hydrogen injection and mixing assembly 100 shown in FIG. 2, the controller 110 may receive the composition of the blended fuel downstream of intersection 23 via an output from the sampling assembly 144.

Also, method 200 includes determining if the hydrogen content (measured, e.g., as volume, mass %, and/or weight % of the blended fuel) in the blended fuel is off target at block 214. The target for the hydrogen content in the blended fuel may be based on the blend ratio from block 208, which may include a range of such blend ratios. If the hydrogen is not off target at block 214 (such that the determination at block 214 is "no") and the amount of hydrogen in the blended fuel sufficiently corresponds to the blend ratio, the method 200 may recycle to block 202. In some embodiments, the amount of hydrogen may correspond to the bend ratio if the hydrogen is within a tolerance or range of the target, such as within +/−10%, +/−5%, +/−1%, or some other specified value.

If the hydrogen is off target at block 214 (such that the determination at block 212 is "yes"), then method 200 may proceed to determine whether the hydrogen is below target at block 216. If it is determined at block 216 that the hydrogen is below target (such as that the determination at block 216 is "yes"), then the method 200 may proceed to adjust, at block 218, a position of the control valve to increase the amount of hydrogen injected Into the natural gas stream based at least in part on the blend composition. If it is determined at block 216 that the hydrogen is not below target (such that the determination at block 216 is "no") then the determination may be made that the hydrogen is above target and the method 200 may proceed to block 220 to bypass a volume of natural gas around the hydrogen injection assembly to dilute hydrogen in the blended fuel based at least in part on the blend composition. In another embodiment, rather than or in addition to bypassing an amount of natural gas, the amount of hydrogen injected into the blend may be adjusted, for example, via a control valve of the hydrogen injection assembly.

For instance, as previously described above for the injection assembly 100 shown in FIG. 2, if the controller 110 determines that the amount of hydrogen in the blended fuel is too low via the output from the sampling assembly 144, the controller 110 may adjust the position of the control valve 104 to increase the amount of hydrogen into the blend via the intersection 23. If the controller 110 determines that the amount of hydrogen in the blended fuel is too high, the controller 110 may then bypass a volume of natural gas from upstream of the intersection 23 to thereby dilute the hydrogen in the blend.

In another embodiment, the controller 110 may determine a selected threshold range based on the determined blend ratio and/or other characteristics or factors. In such embodiments, the selected threshold range may include a selected flow rate range and/or a selected pressure range. The controller 110 may adjust the position of the control valve 104 based on measurements of pressure and/or flow rate of the hydrogen stream and/or natural gas stream exceeding the selected pressure range and/or selected flow rate range. Other thresholds may be set for other characteristics and position of the control valve 104 may be adjusted based on corresponding measurements.

In another embodiment, the controller 110 may determine an updated or subsequent blend ratio. The controller 110 may obtain one or more characteristics and, based on those characteristics, may determine the updated or subsequent blend ratio. The one or more characteristics may include one or more of energy output requirements, one or more characteristics of the natural gas stream (for example, pressure, flow rate, purity, and/or composition, among other characteristics), one or more characteristics of the hydrogen stream (for example, pressure, flow rate, purity, and/or composition, among other characteristics), the one or more characteristics of the blended fuel (for example, pressure, flow rate, and/or composition, among other characteristics), or the blend ratio or current blend ratio. In a further embodiment, the controller 110 may adjust the control valve 104 based on the determined updated or subsequent blend ratio and current flow rate and/or pressure, among other characteristics of the hydrogen stream, the natural gas stream, and/or blended stream.

In some embodiments, the method 200 may also include selecting a source for the hydrogen stream from a plurality of potential sources. For instance, as previously described for the system 10 shown in FIGS. 1 and 2, the injection assembly 100 may be connected to one or more available hydrogen sources 20. In some embodiments, the method 200 may include selecting a source of hydrogen based on a variety of factors such as the proximity of each of the plurality of sources, the volume of available hydrogen from each of the sources, and/or the purity of the hydrogen available from each of the plurality of sources. In some embodiments, one or more of the sources of hydrogen may comprise a mobile source, such as a truck-mounted source and/or skid-based source.

Figure 4:
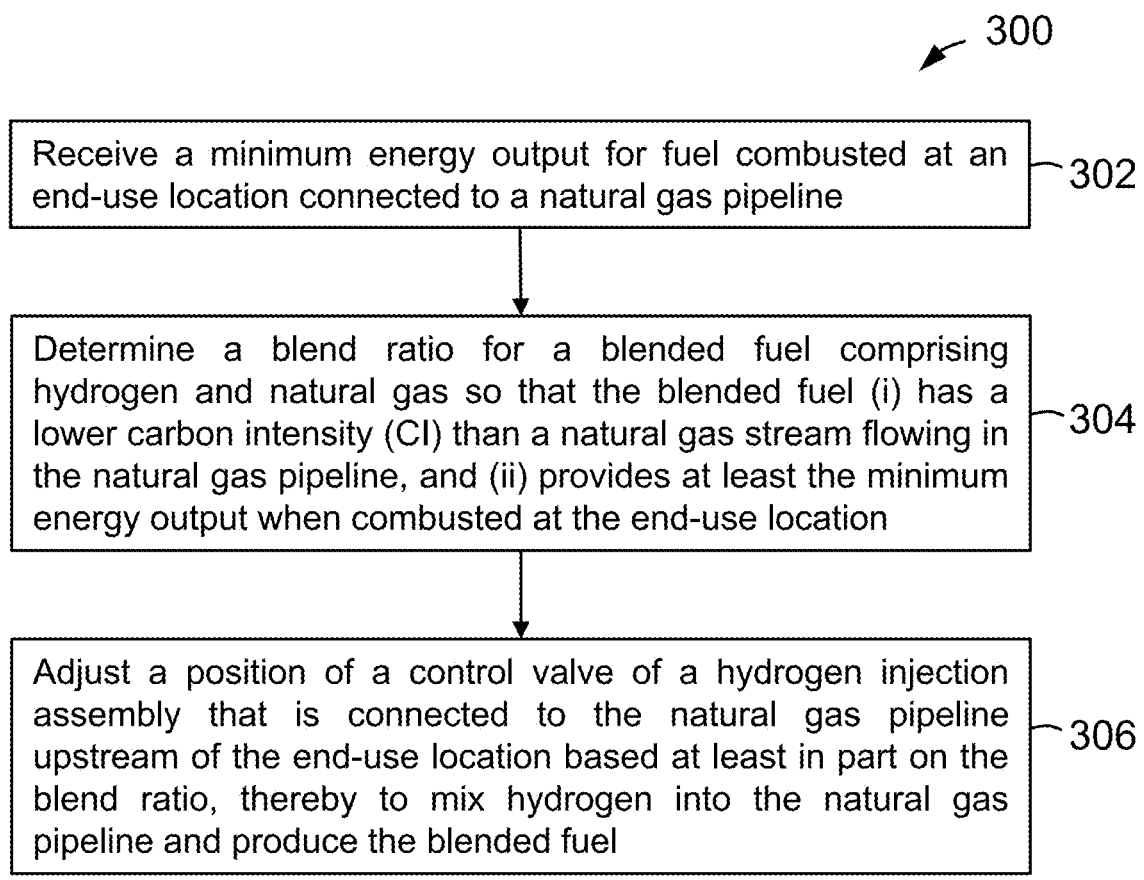
Figures 1, 4:
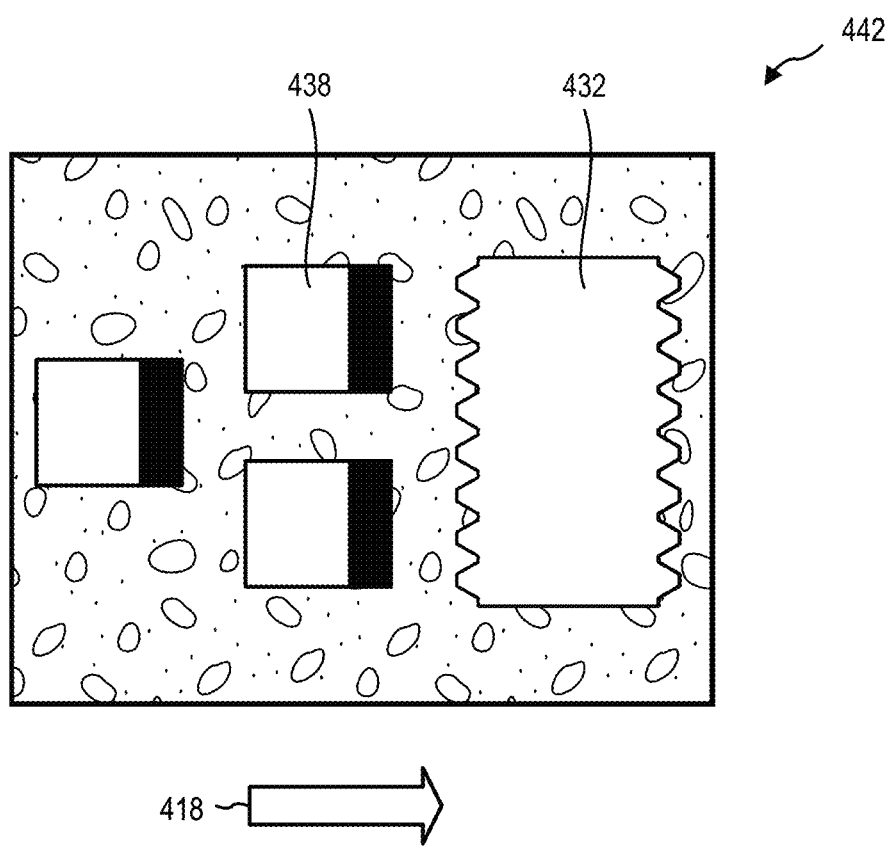

FIG. 4 shows another embodiment of a method 300 for producing a blended fuel comprising hydrogen and natural gas for an end-use location according to some embodiments disclosed herein. In some embodiments, method 300 may be practiced using the system 10 as shown in FIGS. 1 and 2. Thus, in describing the method 300, continuing reference will be made to the features of system 10 shown in FIGS. 1 and 2. However, it should be appreciated that method 300 may be practiced using different systems and assemblies (such as the hydrogen injection assembly 600 shown in FIG. 7 and described herein). Thus, reference to the system 10 of FIGS. 1 and 2 should not be interpreted as limiting all embodiments of method 300.

In addition, at least some steps of the method 300 may be performed (at least in part) using a processor of a controller or other computing device (such as the processor 112 of controller 110 shown in FIGS. 1 and 2). Thus, method 300 may be at least partially representative of machine-readable instructions that are stored on a memory and executed by the processor (such as the machine-readable instructions 116 stored on memory 114 shown in FIGS. 1 and 2).

Initially, method 300 includes receiving a minimum energy output requirement for fuel combusted at an end-use location or a targeted energy output or targeted minimum energy output of a fuel specification for the end-use location connected to a natural gas pipeline at block 302. In other embodiments, the method may include receiving, in addition to or rather than the minimum energy output, a maximum energy output. As previously described, an end-use location (such as end-use location 14 shown in FIGS. 1 and 2) may have minimum energy output requirement (and/or, in other embodiments, a maximum energy output requirement) for combustible fuel therein so as to ensure proper operation of one or more systems and devices therein. For instance, a furnace at an end-use location may have a corresponding minimum and/or maximum energy output for fuel combusted therein to ensure sufficient or permissible heat therein.

In another example, an end-use location, such as an energy provider, may utilize the blended fuel to generate a selected amount of electricity, represented as, for example, kilowatt hours (KWh), at a selected efficiency. To ensure that the energy output of the blended fuel is adequate, the method may include adjusting the amount of hydrogen provided to meet that minimum and/or maximum energy output. In a further example, the percentage of hydrogen may be between about 4 to about 6 percent of the total blend of hydrogen and natural gas to ensure that BTUs per KWh do not fall below a selected threshold (for example, about ten thousand BTUs/KWh). In another embodiment, the minimum energy output may be based on a type of the end-use location (for example, the type including a residential end-use location and/or an industrial end-use location or a facility, a business, a home), among other factors.

In another embodiment, the selected energy output (for example, the minimum energy output and/or maximum energy output) may be determined based on a specification associated with equipment at the end-use location. As noted, an end-use location may include different equipment. Each piece of equipment at an end-use location may be designed to operate at a minimum BTU and/or a maximum BTU. For example, a residential tank-based water heater may be designed to operate at a minimum of 4000 BTUs per hour. Thus, the fuel specification of the residential tank-based water heater must provide a minimum energy output of at least 4000 BTUs per hour. The controller 110 described herein may determine the amount of hydrogen to include in the final blend based on the minimum energy output, as well as other characteristics described herein.

In addition, method 300 includes determining, at block 304, a blend ratio for a blended fuel comprising hydrogen and natural gas so that the blended fuel (i) has a lower or reduced carbon intensity (CI) as compared to a natural gas stream flowing in the natural gas pipeline, and (ii) provides at least the minimum energy output (and/or, in other embodiments, less than or equal to the maximum energy output) when combusted at the end-use location. Further, method 300 includes adjusting, at block 306, a position of a control valve of a hydrogen injection assembly that is connected to the natural gas pipeline upstream of the end-use location based at least in part on the blend ratio, thereby to mix hydrogen into the natural gas pipeline and produce the blended fuel.

Thus, via blocks 304 and 306, a blended fuel may be mixed within the natural gas pipeline that both satisfies the energy output requirements at the end-use location (such as a targeted minimum and/or maximum energy output of a fuel specification for the end-use location or, in other words, a targeted energy output of the blended fuel specified by the end-use location) and provides a lower-CI fuel (compared to the natural gas stream) so that carbon emissions are reduced during combustion thereof. In addition, because method 300 utilizes the natural gas pipeline for hydrogen injection and mixing per block 306, additional infrastructure costs for implementing method 300 in an existing natural gas pipeline network may be minimized.

Figure 5:
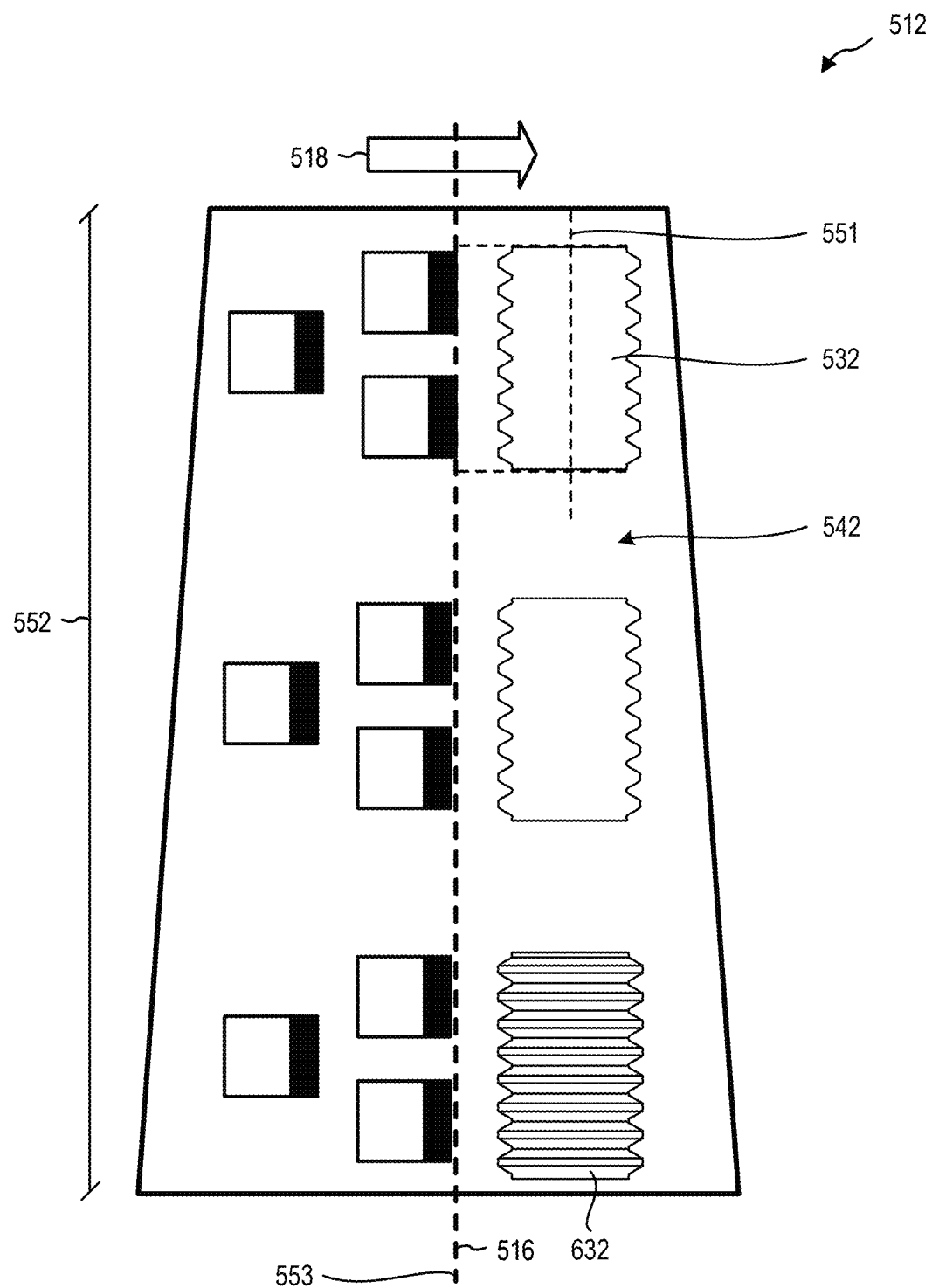

FIG. 5 shows another embodiment of a method 400 for producing a blended fuel comprising hydrogen and natural gas for an end-use location according to some embodiments disclosed herein. In some embodiments, method 400 may be practiced using the system 10 as shown in FIGS. 1 and 2, and at least some steps may be at least partially performed using the controller 110. Thus, in describing the method 400, continuing reference will be made to the features of system 10 shown in FIGS. 1 and 2. However, it should be appreciated that method 400 may be practiced using different systems and assemblies (such as the hydrogen injection assembly 600 shown in FIG. 7 and described herein). Thus, reference to the system 10 of FIGS. 1 and 2 should not be interpreted as limiting all embodiments of method 400.

Initially, method 400 includes measuring (such as real-time, continuous measuring) one or more characteristics of a hydrogen gas stream at block 402 and one or more characteristics of a natural gas stream at block 404. The one or more characteristics of the hydrogen gas stream and natural gas stream may include one or more of a pressure, temperature, density, flow rate, purity, or composition. In some embodiments, the one or more characteristics include a density and flow rate (such as a mass flow rate) of both the hydrogen gas stream and the natural gas stream. Thus, determining one or more characteristics of the hydrogen gas stream and natural gas stream at blocks 402 and 404, respectively may comprise receiving outputs from one or more sensors or assemblies that are configured to measure or detect the one or more characteristics (or values indicative thereof). For instance, for the hydrogen injection and mixing assembly 100 of FIG. 2, the controller 110 may receive outputs from the flow meters 130, 132, 136, sampling assemblies 140, 142, 144, and sensors 148, 150 to determine one or more of the above-noted characteristics of both the natural gas stream flowing in pipeline 16 and the hydrogen stream flowing in hydrogen injection line 22.

In addition, method 400 includes, at block 406, determining a hydrogen mass flow rate based on an end-use blend ratio and the stream characteristics from blocks 402, 404. As previously described, the blend ratio for a blended fuel for use at an end-use location may be specified by an end-user (for example, such as an owner or operator of the end-use location), and/or may be selected and determined based on various considerations, such as, for instance, the energy output requirements for the end-use location (for example, including a targeted minimum and/or maximum energy output of a fuel specification for the end-use location), the purity or compositional makeup (or other characteristics) of the natural gas stream, and/or the purity or compositional makeup (or other characteristics) of the hydrogen stream.

Method 400 also includes measuring (such as real-time continuous measuring) one or more blend stream characteristics at block 408. As previously described for blocks 402, 404, the one or more characteristics of the blend stream may include one or more of a pressure, temperature, density, flow rate, or composition. In some embodiments, the one or more characteristics of the blend stream may include a density and flow rate (such as a mass flow rate). For instance, as previously described for the hydrogen injection and mixing assembly 100 shown in FIG. 2, the controller 110 may determine the one or more characteristics of the blended fuel downstream of intersection 23 via an output from the sampling assembly 144.

At block 410, method include determining if one or more blended stream characteristics are off target. The determination at block 410 may be at least partially based on the measurement(s) at block 408. Thus, the determination at block 410 may comprise determining that one or more of the measured characteristics from block 408 are off target. For instance, block 410 may comprise determining whether one or more of a pressure, temperature, density, flow rate, or composition of the blend stream may be off target. Thus, in some embodiments, block 410 may comprise determining whether a flow rate (such as a mass flow rate) and density of the blended stream is off target. For the system 10 of FIGS. 1 and 2, the determination at block 410 may be made, at least partially, by controller 110.

If it is determined at block 410 that the one or more characteristics are not off target (such that the determination at block 410 is "no"), then method 400 may repeat block 408 so as to continue measuring the one or more characteristics of the blended stream. If it is determined at block 410 that the one or more characteristics of the blended stream are off target (such that the determination at block 410 is "yes"), then method 400 may proceed to determine if the one or more characteristics are above target at block 412.

If it is determined at block 412 that the one or more characteristics are not above target at block 416 (such that the determination at block 412 is "no"), then it is determined that the one or more characteristics are below target at block 414. If it is determined at block 412 that the one or more characteristics are above target (such that the determination at block 416 is "yes"), then method 400 may proceed to determine whether the one or more characteristics are still within an allowable limit at block 416. Similarly, after it is determined at block 414 that the one or more characteristics are below target at block 414, method 400 may proceed to determine whether the one or more characteristics are still within an allowable limit at block 418.

The allowable limits in blocks 416, 418 may be the same or different. For instance, the allowable limits in blocks 416, 418 may define an allowable range of the one or more characteristics of the blend stream that may be based on a number of factors (such as end-user specification, safety specifications or indications, equipment type, fuel usage, and/or energy requirement).

If, at block 416, it is determined that the one or more characteristics (which are above target as previously described) are within the allowable limit (such that the determination at block 416 is "yes"), then method 400 may proceed to open a hydrogen control valve and/or close a natural gas control valve at block 420 to drive a characteristic to the target. In addition, if, at block 418, it is determined that the one or more characteristics (which are below target as previously described) are within the allowable limit (such that the determination at block 418 is "yes"), then method 400 may proceed to close the hydrogen control valve and/or open the natural gas control valve at block 424 to drive a characteristic to the target.

For instance, as previously described, the one or more characteristics may include a mass flow rate and density of the blend stream. Thus, if a density and/or mass flow rate of the blend stream is above target at block 412 (and within the allowable limit at block 416), opening a hydrogen control valve and/or closing a natural gas control valve at block 420 may increase a relative amount of hydrogen (which is lighter and less dense than natural gas) in the blend stream to thereby lower the density and/or mass flow rate of the blend stream toward the target. In another embodiment, if the density and/or mass flow rate of the blend stream is below target at block 414 (and within the allowable limit at block 418), closing the hydrogen control valve and/or opening the natural gas control valve at block 424 may decrease a relative amount of hydrogen (again, which is lighter and less dense than natural gas) in the blend stream to thereby increase the density and/or mass flow rate of the blend stream toward the target. For instance, in the system 10 shown in FIGS. 1 and 2, the adjustments of blocks 420, 424 may be performed by adjusting the control valve 104 and/or another control valve (not shown) for controlling the flow rate of the natural gas through pipeline 16. After adjusting the control valves in block 420 or block 424, method 400 may continue measuring the one or more characteristics of the blend stream at block 406.

If it is determined either at block 416 or block 418 that the one or more characteristics are outside of the allowable limit, then method 400 may proceed to open a natural gas bypass to dilute the blend stream at block 422. For instance, as previously described above for the injection assembly 100 shown in FIG. 2, the controller 110 may bypass a volume of natural gas from upstream of the intersection 23 to thereby dilute the hydrogen in the blend if one or more characteristics thereof (such as mass flow rate and/or density) are sufficiently off target (such as outside an allowable limit). Thereafter, method 400 may include continuing to monitor one or more characteristics of the natural gas stream. The monitoring may be performed on the bypass line to determine the characteristics of the natural gas stream diluting the blended stream. In some embodiments, method 400 may also include notifying downstream facilities (such as further downstream blending facilities) of the off target blend event determined via blocks 410, 412, 414, 416, 418, 422, so that further tracking and/or remedial action may be taken in light thereof.

Figure 6:
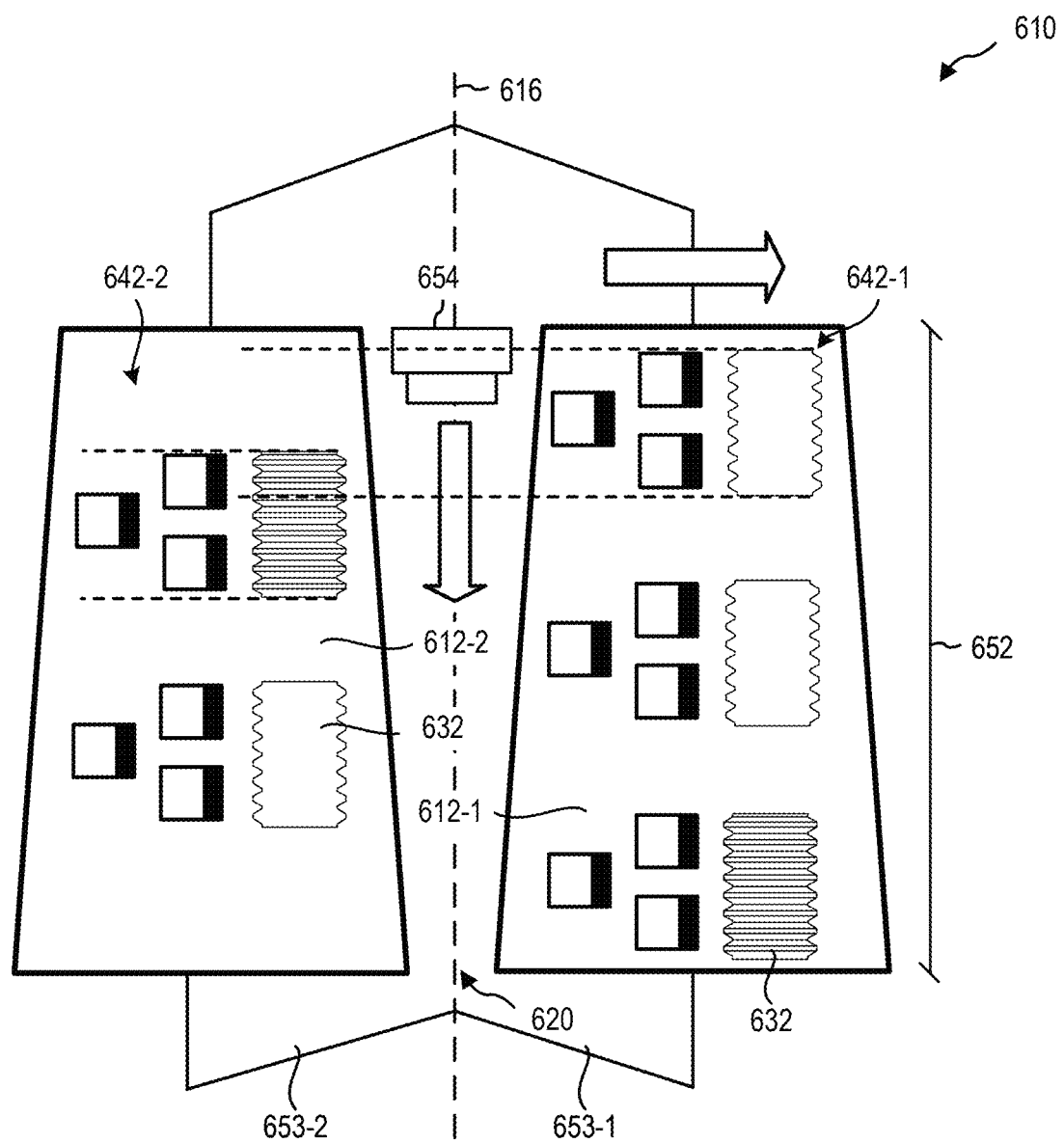
FIG. 6 is a block diagram of a method of operating a system for mixing hydrogen into a stream of natural gas according to some embodiments disclosed herein.

FIG. 6 shows an embodiment of method 500 that operates a system for mixing hydrogen into a stream of natural gas according to some embodiments disclosed herein. In some embodiments, method 500 may be practiced using the system 10 as shown in FIGS. 1 and 2, and at least some steps may be at least partially performed using the controller 110. Thus, in describing the method 400, continuing reference will be made to the features of system 10 shown in FIGS. 1 and 2. However, it should be appreciated that method 400 may be practiced using different systems and assemblies (such as the hydrogen injection assembly 600 shown in FIG. 7 and described herein). Thus, reference to the system 10 of FIGS. 1 and 2 should not be interpreted as limiting all embodiments of method 500.

Initially, method 500 includes monitoring the health of the system at block 502. As used herein, the health of the system may refer to the components, equipment, devices, and/or infrastructure associated with the injection of hydrogen in relation to the injection of hydrogen into a blend. The health of the system may also refer to the sensors and/or other similar components distributed throughout the system and whether those components are providing accurate measurements. In an example, for the system 10 shown in FIGS. 1 and 2, the controller 110 may receive outputs from one or more sensors (such as sensors 148, 150, among others) and based thereon, may determine an operating condition or health of the system 10 (or one or more components thereof). In a further example, the controller 110 may receive the pressure (and/or other characteristic, in other embodiments) from one or more of the sensors 148, 150 and, based on that pressure, determine the health of the system. If the pressure is outside of a selected threshold range, then the controller 110 may indicate that the health of the system is degraded or that a system error has occurred.

In addition, method 500 includes determining if a system error has occurred at block 504. The system error may include a fault or failure of one or more components of the system, a loss of signal from a sensor (or sensors) or a component of the system, a reduced or off-specification performance of a component of the system, or some combination thereof.

If it is determined that a system error has not occurred at block 504 (such that the determination at block 504 is "no"), method 500 may return to block 502 to continue monitoring system health. If it is determined that a system error has occurred at block 504 (such that the determination at block 504 is "yes"), method 500 may proceed to cease hydrogen injection at block 506. For instance, for the system 10 shown in FIGS. 1 and 2, ceasing hydrogen injection at block 506 may include adjusting one or more valves, such as the control valve 104, isolation valve 108, bypass valve 146, another natural gas control or isolation valve (not shown) so as to cease the blending of the hydrogen stream and the natural gas stream. In addition, or alternatively, ceasing hydrogen injection at block 506 may include shutting down one or more pumps or compressors, such as, for instance, compressors 18, 102.

In addition, method 500 may include enacting shutdown procedures at block 508. The shutdown procedures at block 508 may at least partially include adjusting of valves and/or the shutting down of one or more pumps or compressors as previously described for block 506. Also, the shutdown procedures at block 508 may alternatively or additionally include other actions, such as, for instance, venting one or more streams to a tank or to atmosphere, flaring one or more streams, activating one or more pumps or compressors (such as recycle pumps/compressors, pumps/compressors associated with a flaring or other disposal system), issuing an alarm (such as an audible, tactile, visual, alarm, and/or digital alarm message).

FIG. 7 shows a schematic diagram of an embodiment of the system 10 of FIG. 1 and illustrates further details of another embodiment of the hydrogen injection assembly 600. The embodiment of the hydrogen injection assembly 600 may be substantially similar to the hydrogen injection assembly 100 shown in FIG. 2 and previously described herein. Thus, the hydrogen injection assembly 600 may share a number of components with the hydrogen injection assembly 100 of FIG. 2, and these shared components are identified in FIG. 7 with the same reference numerals. As a result, the description below will focus on the features of hydrogen injection assembly 600 that are different from hydrogen injection assembly 100. Other embodiments of a hydrogen injection assembly are contemplated that include combinations and sub-combinations of features of the hydrogen injection assemblies 100, 600.

Specifically, for the hydrogen injection assembly 600, the hydrogen is injected into the natural gas stream via a mixing apparatus 164 rather than at intersection 23 (FIG. 2) as previously described. The mixing apparatus 164 may comprise a vessel, tank, or other volume that is sized and configured to receive both the natural gas stream and hydrogen to facilitate mixing thereof. An addition, control valve 160 and isolation valve 162 may be positioned along the natural gas pipeline 16, upstream of the mixing apparatus 164 to allow controller 110 to control the flow rate of natural gas into the mixing apparatus 164 during operations. As a result, via adjustments to the control valves 104, 160, the controller 110 may control both the blend ratio as well as the residence time for the streams in the mixing apparatus 164 to achieve a desired, targeted, or selected mixture thereof.

Further, an the sensor or meter 166 (also referred to as a natural gas pipeline sensor) may be positioned along the natural gas pipeline 16, downstream of the mixing apparatus 164. The sensor or meter 166 may allow controller 110 to determine the flow rate (such as a mass flow rate) of the blended stream during operations. In another embodiment, the sensor or meter 166 may measure the pressure and/or other characteristics of the blended stream during operations.

At least some embodiments disclosed herein include systems and methods for mixing hydrogen into a stream of natural gas, so as to lower a density of carbon and therefore reduce carbon emissions associated therewith. As previously described, the systems and methods for mixing of hydrogen into a stream of natural gas may include on-demand injecting and mixing of hydrogen into the natural gas stream to achieve a desired, targeted, or selected blend ratio that is based on a variety of factors, including, without limitation, the energy output requirements for fuel combusted at the end-use location and/or a targeted minimum and/or maximum energy output of a fuel specification for the end-use location, the end-use location's infrastructure, one or more characteristics of the natural gas stream, and/or one or more characteristics of the injected hydrogen stream. Thus, through use of the embodiments disclosed herein, hydrogen may be mixed into a stream of natural gas to effectively lower its CI relative to a CI of the natural gas stream while avoiding undesirable impact to the performance of the natural gas as a fuel source and/or downstream infrastructure.

The preceding discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the discussion herein and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (for example, central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like, when used in reference to a stated value mean within a range of plus or minus 10% of the stated value.

This application claims priority to and the benefit of U.S. Provisional Application No. 63/518,417, filed Aug. 9, 2023, titled "SYSTEMS AND METHODS FOR MIXING HYDROGEN WITH NATURAL GAS," the disclosure of which is incorporated herein by reference in its entirety.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

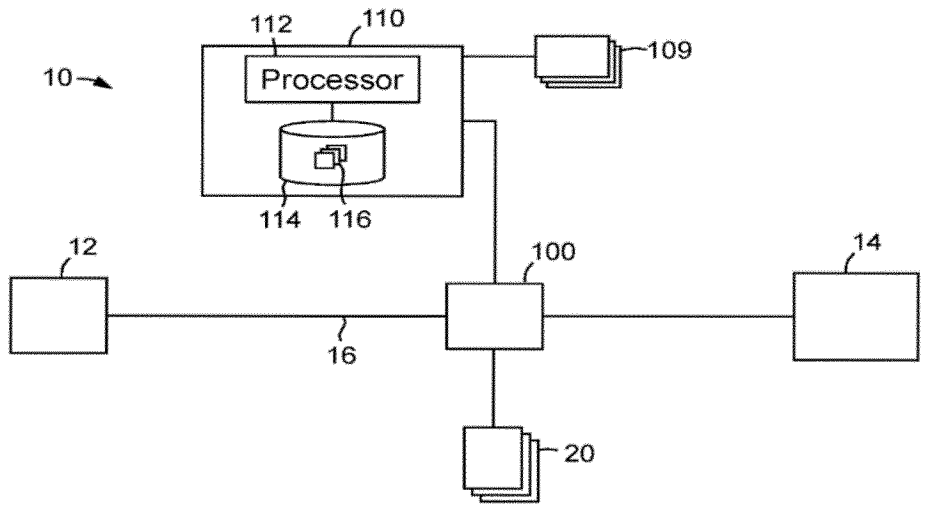

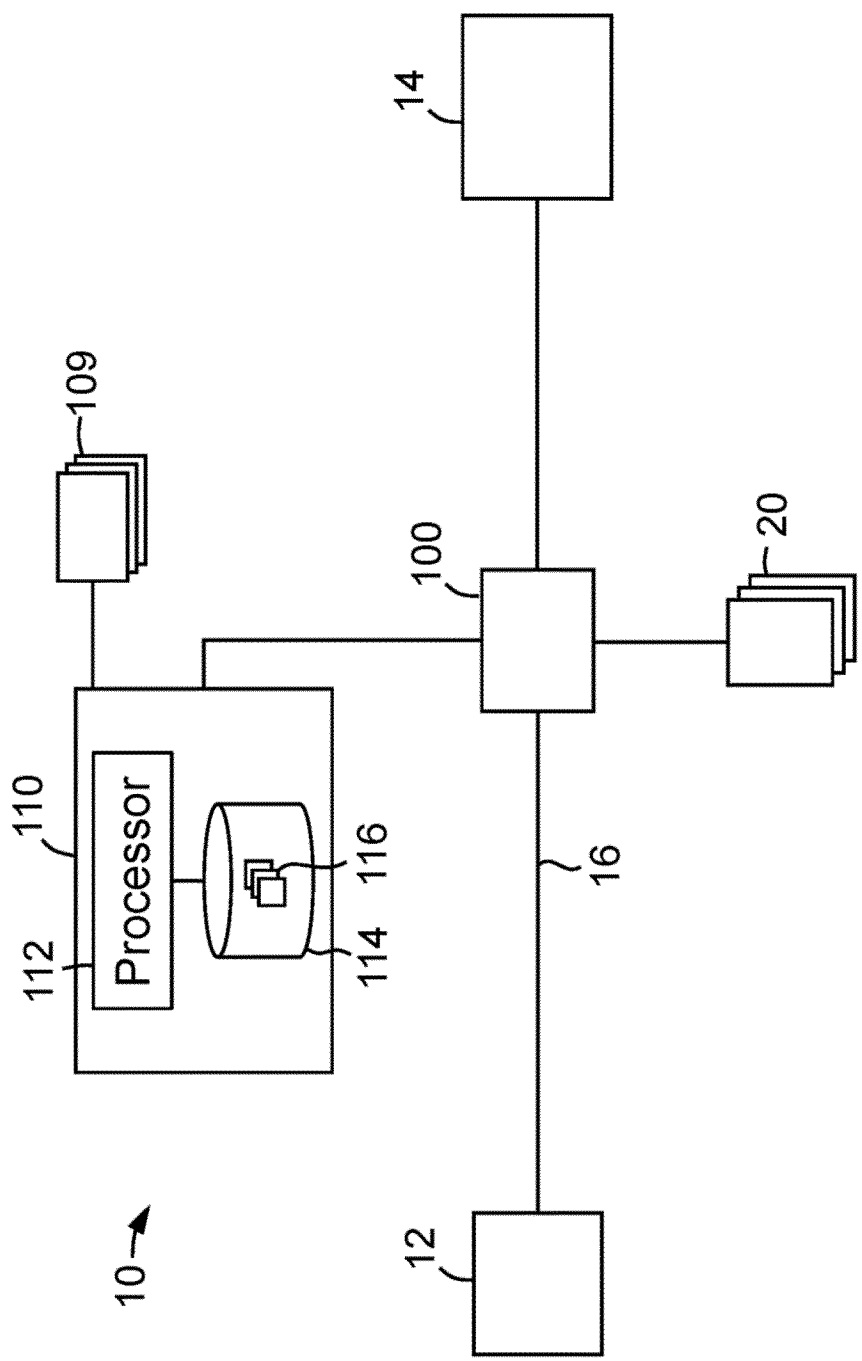

What is claimed is:

1. A method of injecting hydrogen into a natural gas pipeline, the method comprising:

(a) receiving a targeted minimum energy output of a fuel specification for an end-use location when connected to the natural gas pipeline;

(b) determining a blend ratio for a blended fuel comprising hydrogen and natural gas so that the blended fuel (i) has a lower carbon intensity (CI) than a natural gas stream when flowing in the natural gas pipeline, and (ii) provides at least the targeted minimum energy output when combusted at the end-use location;

(c) adjusting a position of a control valve of a hydrogen injection assembly connected to the natural gas pipeline upstream of the end-use location based at least in part on the blend ratio, thereby to mix hydrogen injected from the hydrogen injection assembly into the natural gas pipeline and produce the blended fuel to meet or exceed the targeted minimum energy output of the fuel specification;

(d) determining a composition of the blended fuel in the natural gas pipeline downstream of the hydrogen injection assembly;

(e) determining that a hydrogen content of the blended fuel is above a target based on the composition of the blended fuel; and (f) bypassing a portion of the natural gas stream around the hydrogen injection assembly to dilute the hydrogen content in the blended fuel based on (d) and (e).

2. The method of claim 1, wherein (c) further comprises adjusting the position of the control valve further based on one or more of a composition of the natural gas stream or a composition of a hydrogen stream emitted from a source connected to the hydrogen injection assembly.

3. The method of claim 1, further comprising:
determining one or more of pressure or flow rate of one or more of (a) the natural gas stream flowing in the natural gas pipeline or (b) the hydrogen injected from the hydrogen injection assembly; and
in response to one or more of the pressure or flow rate of one or more of (a) the natural gas stream flowing in the natural gas pipeline or (b) the hydrogen injected from the hydrogen injection assembly being outside of a selected threshold range:
adjusting the position of the control valve of the hydrogen injection assembly to maintain the blend ratio.

4. The method of claim 3, wherein the selected threshold range comprises one or more of a selected pressure range or a selected flow rate range of one or more of (a) the natural gas stream flowing in the natural gas pipeline or (b) the hydrogen injected from the hydrogen injection assembly based on the blend ratio.

5. The method of claim 1, further comprising:
(g) determining that hydrogen content of the blended fuel is below a target based on the composition of the blended fuel; and
(h) adjusting the position of the control valve to increase hydrogen mixed into the natural gas stream based on (d) and (g).

6. The method of claim 1, wherein (b) further comprises determining the blend ratio based at least partially on an infrastructure characteristic of the end-use location.

7. The method of claim 6, wherein the infrastructure characteristic comprises at least one of a material used at the end-use location, a seal design used at the end-use location, or an equipment design used at the end-use location.

8. A system for injecting hydrogen into a natural gas pipeline that is connected to an end-use location, the system comprising:

a hydrogen injection assembly connected to a source of hydrogen and connected to the natural gas pipeline upstream of the end-use location, the hydrogen injection assembly including:
a hydrogen injection line, and
a control valve positioned on the hydrogen injection line and connected to the natural gas pipeline thereby to provide an amount of hydrogen at a selected pressure and selected flow rate to the natural gas pipeline;
a sample assembly connected to the natural gas pipeline downstream of the hydrogen injection line and configured to produce a first output that is indicative of a composition of the blended fuel; and
a controller communicatively connected to the control valve and sample assembly, the controller configured to:
receive a targeted minimum energy output of a fuel specification for the end-use location;
determine a blend ratio for a blended fuel comprising hydrogen and natural gas so that the blended fuel (i) has a lower carbon intensity (CI) than a natural gas stream when flowing through the natural gas pipeline, and (ii) provides at least the targeted minimum energy output of the fuel specification when combusted at the end-use location;
adjust a position of the control valve based at least in part on the blend ratio, thereby to provide the amount of hydrogen into the natural gas pipeline and produce the blended fuel; and
adjust a position of a second control valve positioned along a bypass line connected to the natural gas pipeline based at least in part on the first output, thereby to dilute hydrogen in the blended fuel.

9. The system of claim 8, further comprising:
a second sample assembly connected to the natural gas pipeline and configured to produce a second output indicative of a composition of the natural gas stream, wherein the controller is communicatively coupled to the second sample assembly and is configured to adjust a position of the control valve based at least in part on the second output; and
a third sample assembly connected to the hydrogen injection line and configured to produce a third output that is indicative of a composition of a hydrogen stream emitted from the source of hydrogen, wherein the controller is communicatively coupled to the third sample assembly and is configured to adjust a position of the control valve based at least in part on the third output.

10. The system of claim 8, wherein the controller is configured to adjust the position of the control valve based at least in part on the output.

11. The system of claim 8, wherein the controller is configured to determine the blend ratio based at least in part on an infrastructure characteristic of the end-use location.

12. The system of claim 8, wherein the hydrogen injection assembly includes one or more sensors positioned along the hydrogen injection line and proximate the control valve, the one or more sensors configured to measure a pressure of hydrogen flowing from the control valve, wherein the controller communicatively connects to the one or more sensors, and wherein the controller is further configured to:
obtain a measurement of the pressure of hydrogen flowing from the hydrogen injection assembly into the natural gas pipeline; and adjust the position of the control valve to maintain the blend ratio based on the pressure of hydrogen flowing from the hydrogen injection assembly.

13. The system of claim 12, further comprising a natural gas pipeline sensor positioned within the natural gas pipeline downstream from the hydrogen injection assembly and configured to measure a pressure of the blended fuel flowing the natural gas pipeline, wherein the controller communicatively connects to the one or more sensor, wherein the controller communicatively connects to the natural gas pipeline sensor, and wherein the controller is further configured to:
- obtain a measurement of the pressure of the blended fuel flowing the natural gas pipeline; and
- adjust the position of the control valve to maintain the blend ratio further based on the pressure of the blended fuel flowing the natural gas pipeline.

14. A method for producing a blended fuel comprising hydrogen and natural gas for an end-use location, the method comprising:
- (a) determining one or more energy output requirements for fuel combusted at the end-use location;
- (b) determining one or more characteristics of a natural gas stream in a pipeline connected to the end-use location;
- (c) determining one or more characteristics of a hydrogen stream;
- (d) determining a blend ratio of hydrogen to natural gas for the blended fuel based at least partially on one or more of (i) the one or more energy output requirements, (ii) the one or more characteristics of the natural gas stream, and (iii) the one or more characteristics of the hydrogen stream;
- (e) determining a composition of the blended fuel;
- (f) adjusting a position of a control valve of a hydrogen injection assembly connected to the pipeline based on the blend ratio to mix the hydrogen stream and the natural gas stream in the pipeline, thereby to form the blended fuel; and
- (g) in response to a determination that a hydrogen content of the blended fuel is above a target based on the composition of the blended fuel, bypassing a portion of the natural gas stream around the hydrogen injection assembly to dilute the hydrogen content in the blended fuel.

15. The method of claim 14, wherein (a) comprises determining a targeted minimum energy output of a fuel specification for at least one system at the end-use location.

16. The method of claim 15, wherein (d) comprises determining the blend ratio so that the blended fuel provides the targeted minimum energy output of the fuel specification for the at least one system at the end-use location.

17. The method of claim 16, wherein (d) comprises determining the blend ratio so that the blended fuel has a reduced carbon intensity (CI) compared to the natural gas stream.

18. The method of claim 14, wherein (b) comprises determining a composition of the natural gas stream, and wherein (c) comprises determining a composition of the hydrogen stream.

19. The method of claim 14, further comprising:
- (g) determining that a hydrogen content of the blended fuel is below a target based on the composition of the blended fuel; and
- (h) adjusting the position of the control valve to increase a flow of hydrogen from the hydrogen stream into the pipeline based on (e) and (g).

20. The method of claim 14, wherein the one or more characteristics of the natural gas comprise one or more of pressure, temperature, density, flow rate, or composition, and wherein the one or more characteristics of the hydrogen comprise one or more of pressure, temperature, density, flow rate, or composition.

21. The method of claim 16, further comprising:
- (i) determining one or more characteristics of the blended fuel, wherein a subsequent blend ratio is further based on the one or more characteristics of the blended fuel; and
- (j) adjusting the position of a control valve of a hydrogen injection assembly connected to the pipeline based on the subsequent blend ratio.

22. A system for injecting hydrogen into a natural gas pipeline connected to an end-use location, the system comprising:
- a hydrogen injection assembly connected to a source of hydrogen and connected to the natural gas pipeline upstream of the end-use location, the hydrogen injection assembly including:
  - a hydrogen injection line connected to the natural gas pipeline at an intersection,
  - a control valve positioned on the hydrogen injection line, and
  - a bypass line connected to the natural gas pipeline at (i) a first point that is upstream of the intersection and (ii) a second point that is downstream of the intersection; and
- a controller communicatively connected to the control valve, the controller configured to adjust a position of the control valve to adjust an amount of hydrogen injected into the natural gas pipeline, thereby to form a blended fuel in the natural gas pipeline based at least in part on one or more of:
  - a targeted energy output of a fuel specification of the end-use location;
  - a characteristic of a natural gas stream flowing in the natural gas pipeline; or
  - a characteristic of a hydrogen stream flowing through the hydrogen injection line.

23. The system of claim 22, wherein the targeted energy output of the fuel specification includes a targeted minimum energy output of the fuel specification for at least one system at the end-use location.

24. The system of claim 22, wherein the characteristic of the natural gas stream comprises a composition of the natural gas stream, and wherein the characteristic of the hydrogen stream comprises a composition of the hydrogen stream.

25. The system of claim 22, further comprising:
- a second control valve positioned on the bypass line; and
- a sampling assembly configured to produce an output that is indicative of a composition of the blended fuel downstream of the intersection,
- wherein the controller is communicatively connected to the second control valve and the sampling assembly, the controller is configured to adjust a position of the second control valve based at least partially on the output.

* * * * *

UNITED STATES PATENT AND TRADEMARK OFFICE
CERTIFICATE OF CORRECTION

PATENT NO. : 12,297,965 B2
APPLICATION NO. : 18/788992
DATED : May 13, 2025
INVENTOR(S) : Thobe et al.

It is certified that error appears in the above-identified patent and that said Letters Patent is hereby corrected as shown below:

On the Title Page

Delete the title page and substitute therefore with the attached title page consisting of the corrected illustrative figure.

In the Drawings

Please replace Figs. 1-8 with Figs. 1-7 as shown on the attached pages.

Signed and Sealed this
Fifth Day of August, 2025

Coke Morgan Stewart
*Acting Director of the United States Patent and Trademark Office*

(12) United States Patent
Thobe et al.

(10) Patent No.: US 12,297,965 B2
(45) Date of Patent: May 13, 2025

(54) SYSTEMS AND METHODS FOR MIXING HYDROGEN WITH NATURAL GAS

(71) Applicant: MARATHON PETROLEUM COMPANY LP, Findlay, OH (US)

(72) Inventors: Zachary D. Thobe, Findlay, OH (US); Stephen D. Ernst, Findlay, OH (US); Jason S. Dalton, Findlay, OH (US)

(73) Assignee: Marathon Petroleum Company LP, Findlay, OH (US)

( * ) Notice: Subject to any disclaimer, the term of this patent is extended or adjusted under 35 U.S.C. 154(b) by 0 days.

(21) Appl. No.: 18/788,992

(22) Filed: Jul. 30, 2024

(65) Prior Publication Data
US 2025/0052379 A1  Feb. 13, 2025

Related U.S. Application Data

(60) Provisional application No. 63/518,417, filed on Aug. 9, 2023.

(51) Int. Cl.
*F17D 3/12*  (2006.01)
*B01F 23/10*  (2022.01)
(Continued)

(52) U.S. Cl.
CPC ............... *F17D 3/12* (2013.01); *B01F 23/10* (2022.01); *B01F 35/2132* (2022.01);
(Continued)

(58) Field of Classification Search
CPC .... F17D 3/12; F17D 1/02; B01F 23/10; B01F 35/833; B01F 35/2132; B01F 2101/503
See application file for complete search history.

(56) References Cited

U.S. PATENT DOCUMENTS 2,626,627 A   1/1953  Jung et al.
2,864,252 A  12/1958  Schaschl
(Continued)

FOREIGN PATENT DOCUMENTS

AU   2010241217   11/2010
AU   2013202839    5/2014
(Continued)

OTHER PUBLICATIONS

Machine Translation of CN-115325460-A (Nov. 8, 2024) (Year: 2024).*
(Continued)

*Primary Examiner* — Matthew J Merkling
(74) *Attorney, Agent, or Firm* — RAY QUINNEY & NEBEKER P.C.; Paul N. Taylor

(57) ABSTRACT

Systems and methods for injecting hydrogen into a natural gas pipeline to lower the carbon intensity of the resulting fuel blend while achieving the required energy output thereof for the end user. In one embodiment a blend ratio for the blended fuel comprising hydrogen and natural gas is determined based at least in part on a minimum energy output for fuel combusted at an end-use location connected to the natural gas pipeline so that the blended fuel (i) has a lower carbon intensity than a natural gas stream flowing in the natural gas pipeline, and (ii) provides at least the minimum energy output when combusted at the end-use location. Further, one or more embodiments include adjusting a control valve of a hydrogen injection assembly connected to the natural gas pipeline upstream of the end-use location based at least in part on the blend ratio to thereby mix hydrogen into the natural gas pipeline and produce the blended fuel.

25 Claims, 8 Drawing Sheets